US005560887A

United States Patent [19]
Roy et al.

[11] Patent Number: 5,560,887
[45] Date of Patent: * Oct. 1, 1996

[54] NEGATIVE PRESSURE CHAMBER TABLE FOR GAS-DRIVEN CUTTING APPARATUS

[75] Inventors: Peter J. Roy; Michael R. Nesta, both of Somers, Conn.

[73] Assignee: Industrial Environmental Technologies, Ltd., Somers, Conn.

[*] Notice: The term of this patent shall not extend beyond the expiration date of Pat. No. 5,435,525.

[21] Appl. No.: 438,401

[22] Filed: May 10, 1995

Related U.S. Application Data

[63] Continuation of Ser. No. 281,630, Jul. 28, 1994, Pat. No. 5,435,525.

[51] Int. Cl.$^6$ ............................................. B23K 7/10
[52] U.S. Cl. ..................................... 266/49; 266/48
[58] Field of Search ..................... 266/48, 49, 65; 148/194, 195; 454/49, 63, 66; 55/305, DIG. 18

[56] References Cited

U.S. PATENT DOCUMENTS

| | | | |
|---|---|---|---|
| 3,295,298 | 1/1967 | Mackey | 55/305 |
| 3,526,395 | 9/1970 | Brown | 266/48 |
| 3,539,168 | 11/1970 | Pfeuffer | 266/48 |
| 3,672,292 | 6/1972 | Arnold | 98/33 |
| 3,687,433 | 8/1972 | Bode, Jr. | 266/48 |
| 3,743,260 | 7/1973 | Alleman et al. | 266/49 |
| 3,784,176 | 1/1974 | Walters et al. | 266/65 |
| 4,058,299 | 11/1977 | Lindkvist | 266/48 |
| 4,162,060 | 7/1979 | Anderson et al. | 266/49 |
| 4,358,091 | 11/1982 | Talanda | 266/49 |

FOREIGN PATENT DOCUMENTS 0123568  5/1988  Japan ........................... 266/49

OTHER PUBLICATIONS

Oxweld Catalog Section 3, "Oxweld Cutting Machines," The Linde Air Products Co. Unit of Union Carbide and Carbon Corporation (F–4487, p–9089). Dec. 1988.
Bulletin 19–106, Dustvent Downdraft Systems, 1992, Dustvent, Inc., pp. 1–8. Dec. 1992.

*Primary Examiner*—Scott Kastler
*Attorney, Agent, or Firm*—Cushman Darby & Cushman, L.L.P.

[57] ABSTRACT

A table and a gas-driven cutting apparatus are provided. The table supports a workpiece in a manner suitable for cutting of the workpiece by the gas-driven cutting apparatus. The table includes an open table top having a plurality of openings for receiving the forced hot gases and a plurality of distributed horizontally arranged contact points for supporting the workpiece. The openings are distributed throughout the table top independently of the cutting paths of the gas-driven cutting apparatus. The table further includes a ventilated stationary negative pressure, situated below the table top and coupled to each of the openings. The table may include a plurality of vertically arranged slats having longitudinal axes extending across the open table top. A plurality of horizontally extending members (e.g., having an inverted V-shape) may be placed between each pair of slats that extend across the open table top. The horizontally extending members together form downwardly angled upper surfaces, each having a lower terminating end that forms a restricted opening in direct contact with the inside of the negative pressure chamber.

20 Claims, 17 Drawing Sheets

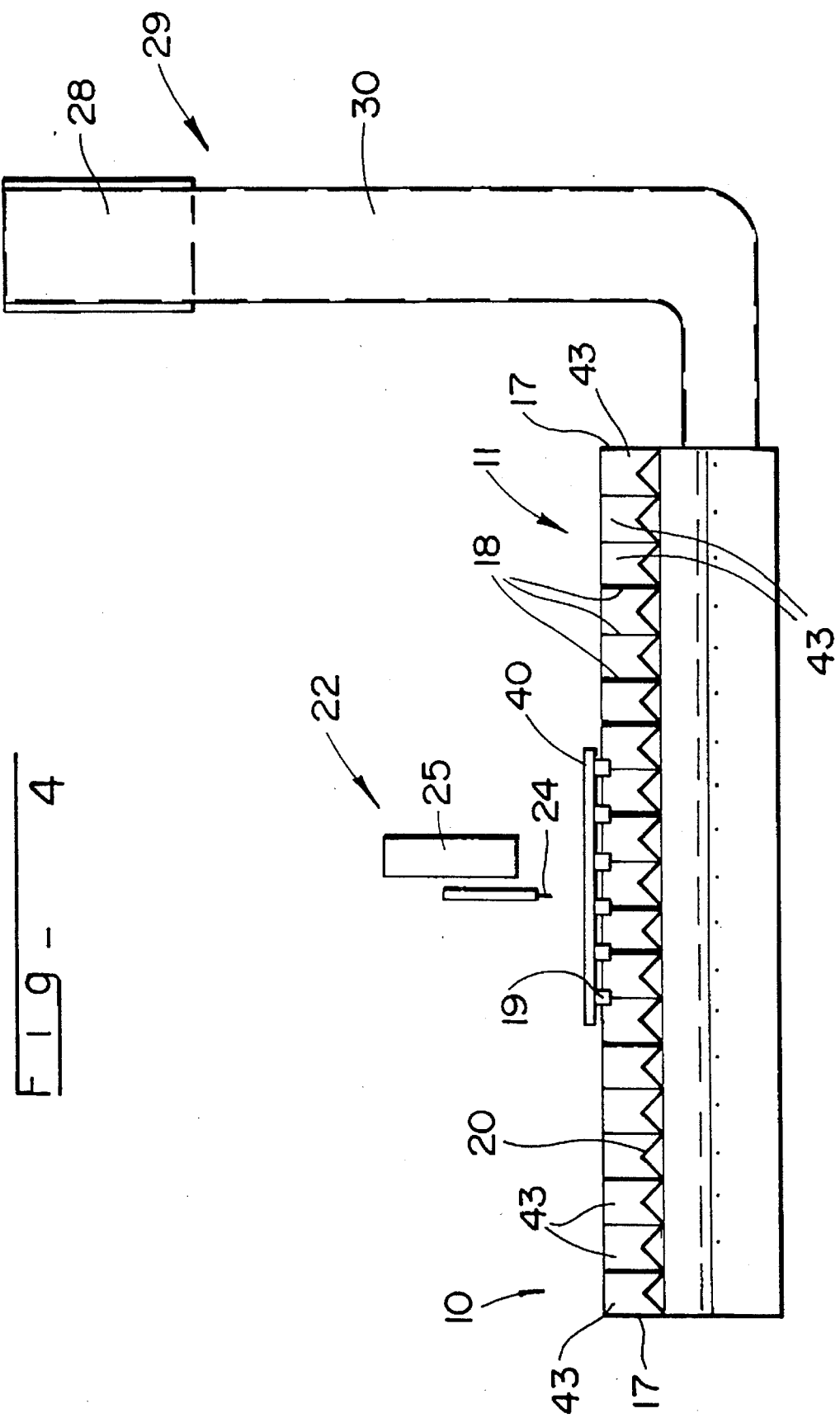

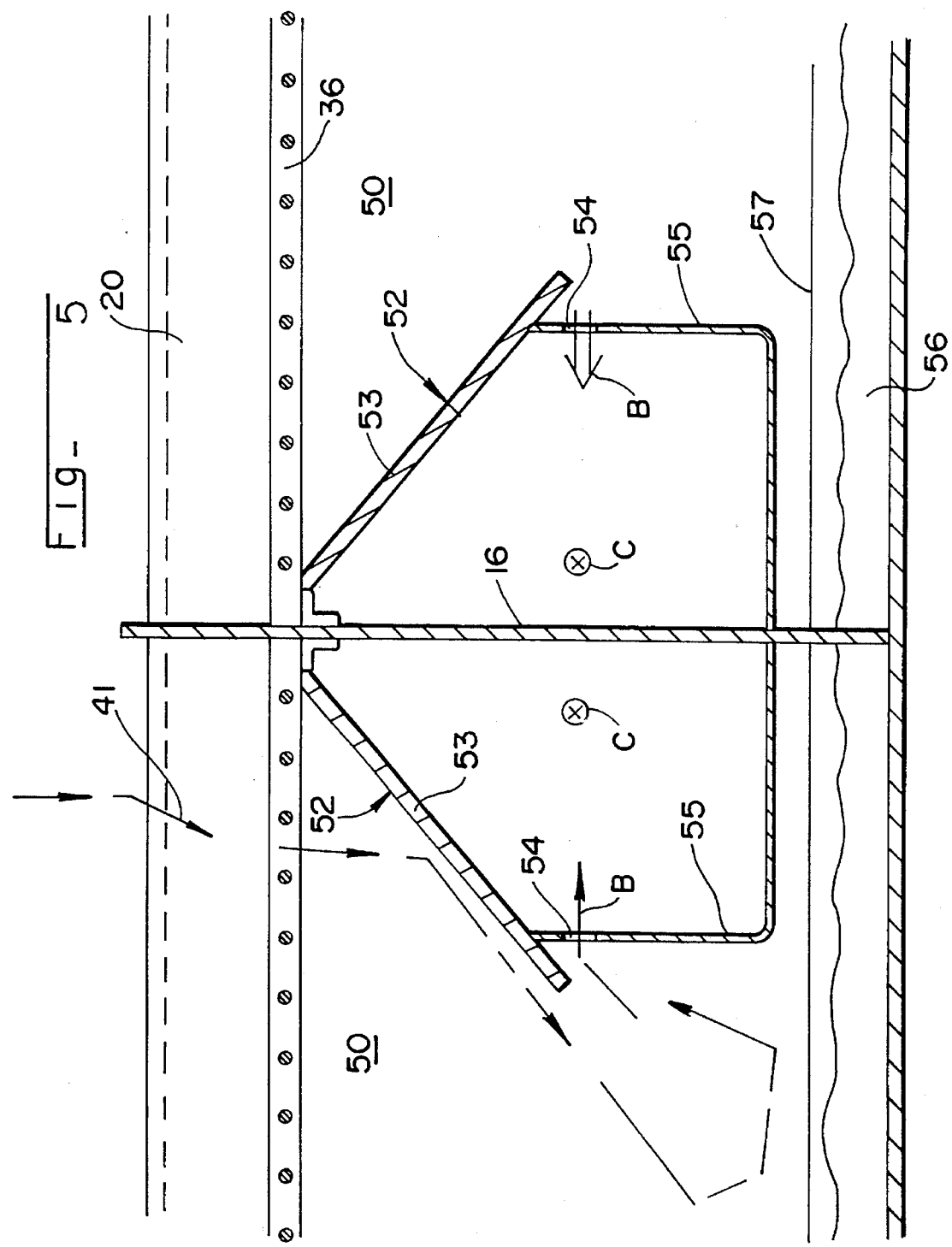

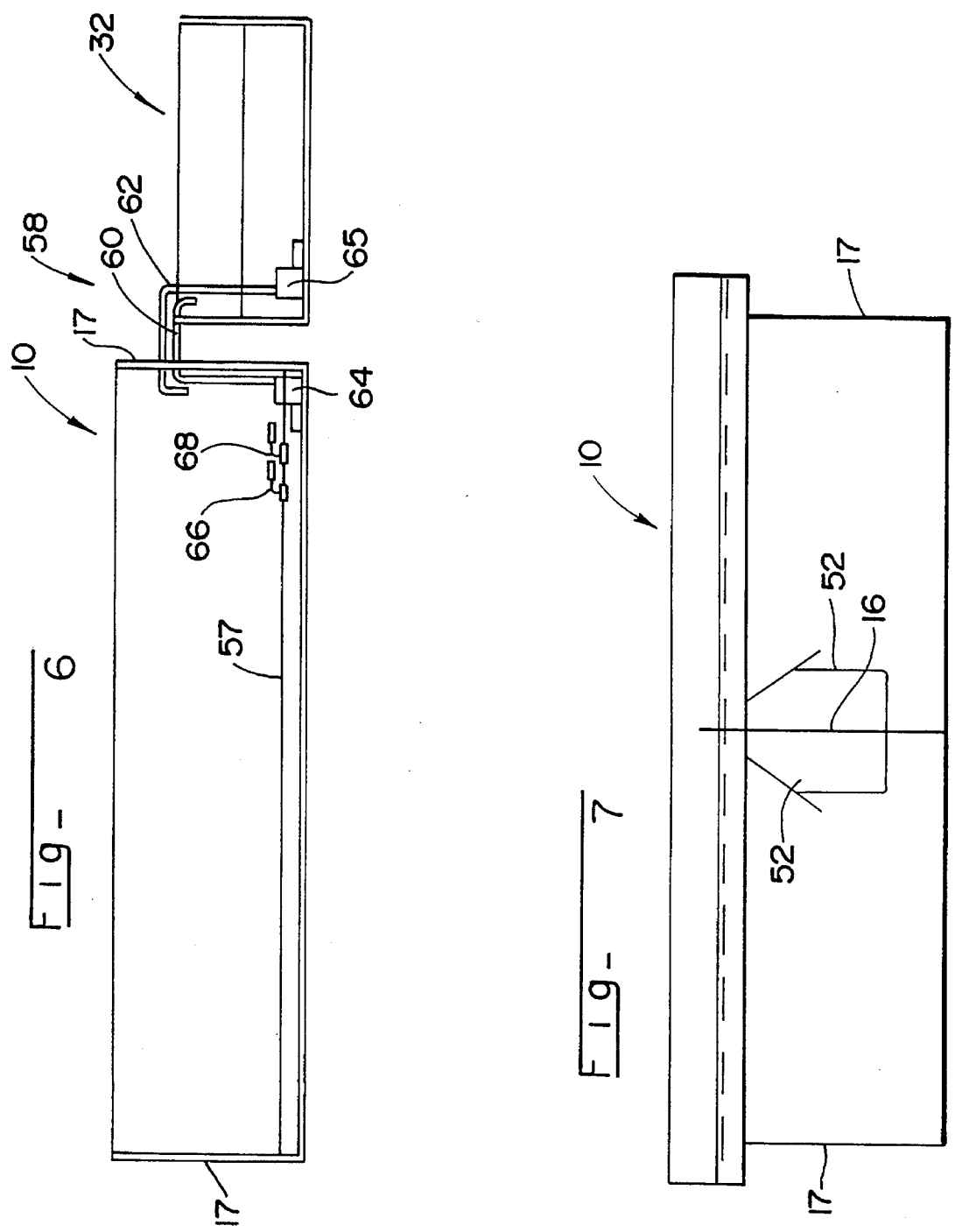

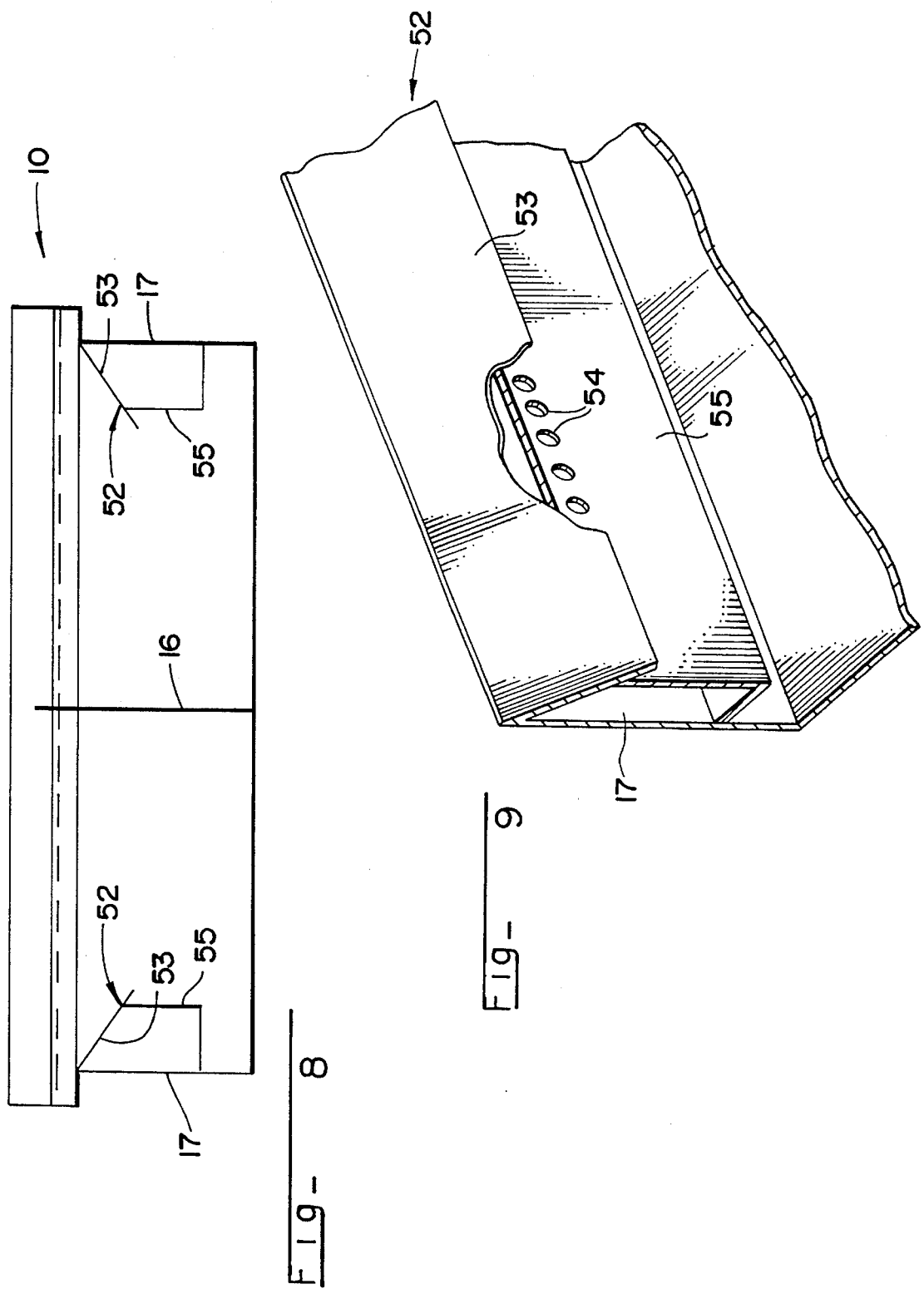

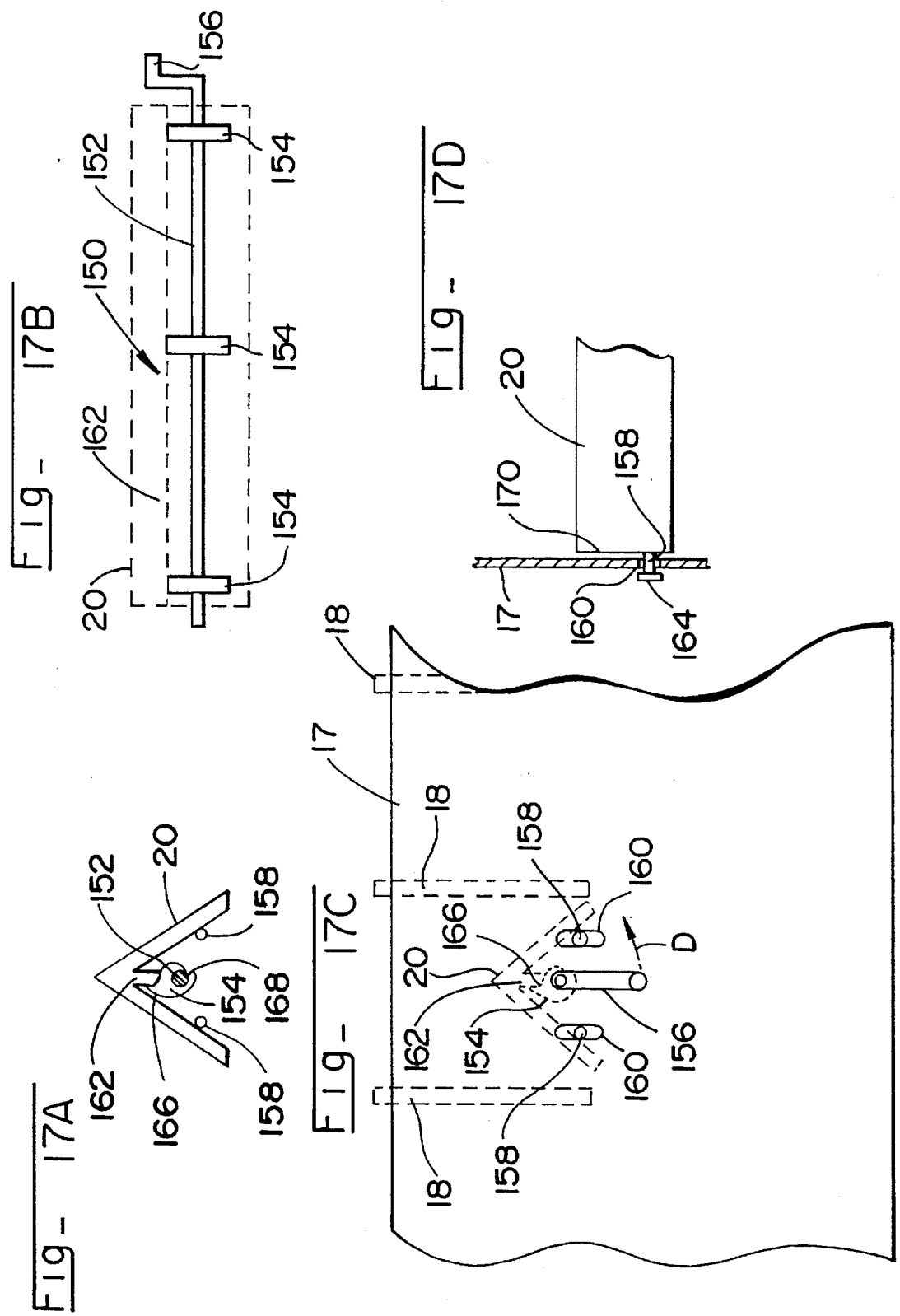

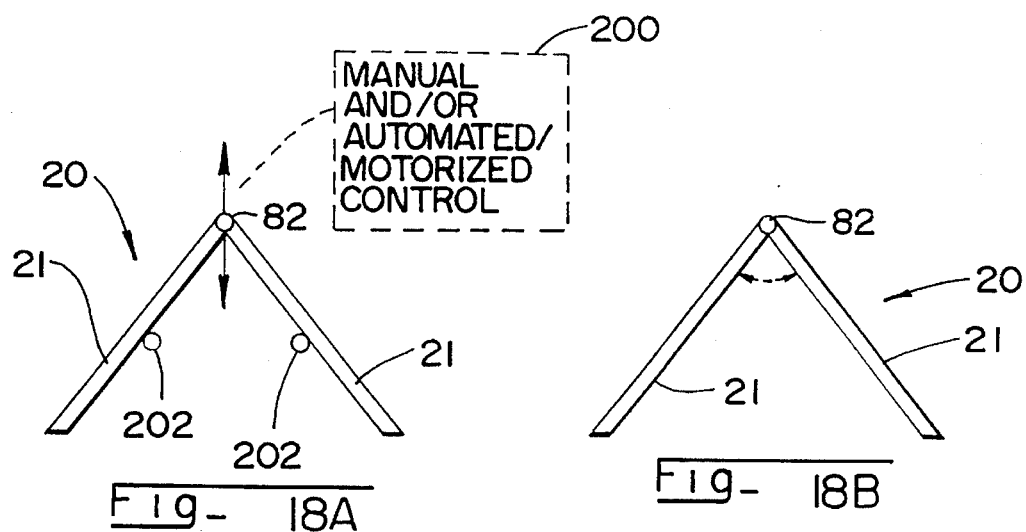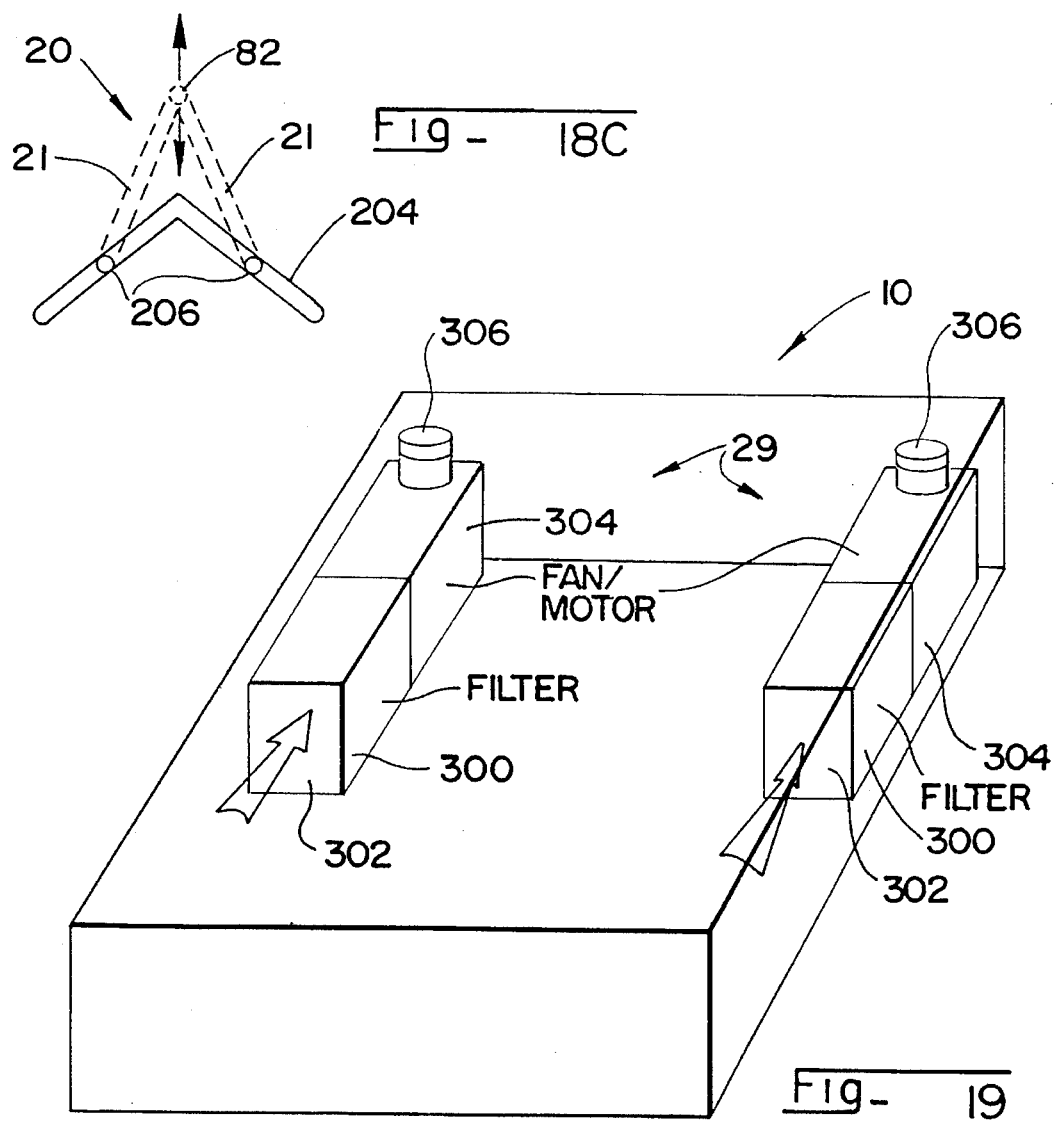

NEGATIVE PRESSURE CHAMBER TABLE FOR GAS-DRIVEN CUTTING APPARATUS

This application is a continuation of application No. 08/281,630, filed Jul. 28, 1994, now U.S. Pat. No. 5,435, 525.

BACKGROUND OF THE INVENTION

1. Field of the Invention

The present invention relates to a gas-driven cutting apparatus and a table for supporting a workpiece in a manner suitable for cutting by the gas-driven cutting apparatus. The gas-driven cutting apparatus forces hot gases in a downward direction into the table in order to cut the workpiece.

2. Discussion of Background Information

Gas-driven cutting (flame cutting) apparatuses perform cutting processes such as oxyfuel cutting and plasma-arc cutting. Oxyfuel cutting is typically used to cut steel workpieces by burning fuel gas in preheated oxygen to raise the workpiece to a kindling temperature (1,500 F). A separate stream of cutting oxygen is driven downward onto the workpiece in order to cut the same. In plasma-arc cutting, a high velocity jet of hot (50,000+F) ionized gas is utilized to sever the workpiece. Plasma cutting can be used to sever almost all conductive materials, including carbon, alloy, and stainless steels, along with most nonferrous metals and alloys. While oxyfuel cutting will have difficulty in properly cutting stainless steel and cast iron, the plasma-arc cutting can cut such materials with little trouble.

In both oxyfuel cutting and plasma-arc cutting, a stream of gas is forced downwardly (at a predetermined flow rate) upon a workpiece. Thus, contaminating/polluting gases are produced at a rate related to the flow rate of the downwardly forced gases produced during the cutting process. As an example, in performing manual oxyacetylene cutting, a gas-driven cutting apparatus will typically generate between 45 and 55 cubic feet per hour (CFH) of oxygen along with 7 to 9 CFH of acetylene in order to cut a plate that is ⅛ inches thick, and between 720–880 CFH of oxygen along with 42.3 to 51.7 CFH of acetylene in order to cut a steel plate that is 12 inches thick. A water-injection plasma-arc cutter will typically generate a total gas flow of 110 cubic feet per hour (CFH) in order to cut mild steel having a thickness of between 0.035 and ¼ inches, using nitrogen as the plasma gas.

Stationery open-top tables are frequently provided to support workpieces being cut by gas-driven cutting apparatuses, such as oxyfuel cutting and plasma-arc cutting apparatuses. Such stationary open-top tables collect molten metal and other solid by-products which drop from the workpiece as it is being cut. In addition, such tables are utilized to collect the scrap pieces that fall into the table. Some stationary open-top tables hold water for collecting dust and other contaminants that fall into the table and for preventing such dust and contaminants from being "kicked up" into the air during the cutting process (due to the forced gases being driven down into the table).

U.S. Pat. No. 3,743,260 (Alleman, et. al) discloses an anti-polluting waste collector for a burn table, adapted for supporting a workpiece beneath a flame cutting machine. The waste collector includes an open tank containing a liquid maintained at a predetermined level therein and a grating disposed across the tank opening.

U.S. Pat. No. 4,162,060 (Anderson et. al) discloses a semi-automatic water table which includes a water-holding tank, a mechanism for changing the water level in the tank and a mechanism for collecting swarf or waste material. The burning table includes a plurality of burning bars positioned in the tank above the water level changing mechanism.

Yet simpler burn tables have been provided which comprise a sealed tank for holding water therein and which support a workpiece for cutting by a flame cutting machine. Such burn tables do not include elaborate mechanisms for removing slag and other wastes that are formed during the cutting process. In these simpler burn tables, waste materials may be removed by simply removing the grating on the top of the table and manually removing the waste materials from within the table on a periodic basis.

Many burn tables have large surface area open tops (e.g., 8 ft.×8 ft., 10 ft×15 ft, or larger) and a plurality of slats upon which a workpiece may be placed for cutting. Such burn tables facilitate cutting of workpieces in any position along the top of the table without limitation as to the cutting path utilized by the cutting apparatus. In order to remove the gases, fumes, and minute contaminants that are produced during the cutting process with such tables, overhead air cleaners have been utilized for removing such pollutant matter after it has already been introduced into the atmosphere. Such overhead air cleaners typically take a long time to filter the pollutant matter from the atmosphere, and typically take an hour or longer after the atmosphere is contaminated to remove most of the contaminating particles and fumes. Thus, if torch cutting is performed on a table for eight hours, the work area will remain polluted for nine hours. An industrial air cleaner that may be used in a manufacturing plant for this purpose is the Tepco model M3000 heavy duty industrial air cleaner.

Down draft tables, which have small surface area open tops, are available, and create a powerful draft across the upper surface of the table in order to suck the gases and dirt down into the table. Such down draft tables utilize powerful fans to create a draft over table tops having small surface areas.

Various pollution removal mechanisms have been provided for specialized burn tables, in which a fume removal conduit is provided at a location adjacent to where a cut is being performed on a workpiece. For example, U.S. Pat. No. 3,539,168 (PFEUFFER) discloses equipment for flue gas extraction and cutting of continuous casting installations. The workpiece (a continuous casting) is supported on spaced support elements. The cutting device moves synchronously above the workpiece, and cuts the workpiece at a location between a pair of the support elements. At a location at which the workpiece will not be cut, a completely closed off roof-shaped plate is provided to cover a space 21. When the workpiece is at a cutting location, two single plates 28, 28a are arranged over the space 21. A spacing is provided between the plates because a continuous covering plate in the operating range of the cutting torch would become damaged by the cutting flame. The fume gases that are created in and near the opening are concentrated by the shielding of space 21 and may be drawn off from the space.

U.S. Pat. No. 4,058,299 (LINDKVIST) discloses an apparatus for removing polluting matter in connection with a flame cutting table. A moveable suction box is provided below the table and means are provided for reducing the speed of jets directed from the flame cutters toward the interior of the suction box.

In the apparatus of U.S. Pat. No. 3,539,168 (PFEUFFER), a collecting chamber is provided immediately below the position at which the workpiece is cut. In that patent, the workpiece is moved, while the chamber remains stationary. In U.S. Pat. No. 4,058,299 (LINDKVIST), the workpiece is stationary, and a suction box is moved so that it is directly underneath the position at which the workpiece is being cut. Thus, the first patent moves the workpiece so that it is cut over a localized collecting chamber, and the second patent moves a suction box so that it is directly underneath the position of cutting of the workpiece. In each of these patents, a suction device is provided which is localized and thus can provide a higher suction power in order to remove the fumes and particulate matter.

There is a need for a cutting table having an open top with a large surface area, which can collect large pieces of slag and other waste materials that are dropped from the workpiece while it is being cut, and that can also remove gases, fumes and other minute particles before they are introduced into the atmosphere while cutting is being performed. There is a particular need for such a flame cutting table that can facilitate cutting workpieces of all sizes at various positions throughout the open top of the table, without the need to provide a localized suction chamber.

SUMMARY OF THE INVENTION

In view of the above, the present invention, through one or more of its various aspects and/or embodiments is thus presented to bring about one or more objects and advantages, such as those noted below.

It is an object of the present invention to provide a cutting apparatus and a flame cutting table. The flame cutting table should absorb fumes and minute polluting matter produced by the cutting apparatus, and it should support workpieces of different sizes, whereby the cutting apparatus can cut such workpieces without limitations as to the cutting path.

It is a further object of the present invention to provide a stationary flame cutting table, that is easy to disassemble and/or includes a mechanism for facilitating the cleanup of slag and other waste products.

It is yet a further object of the present invention to provide a flame cutting table, such as a water table, which includes a negative pressure cheer situated below the table top.

It is yet a further object of the present invention to provide a flame cutting table with a plurality of horizontally extended members which direct fumes and other waste particles into the negative pressure chamber of the table and which decrease the open area of the overall table top in order to reduce the amount of negative pressure that would be needed to keep the fumes and other particles in the chamber.

The present invention, therefore, is directed to a table and a gas-driven cutting apparatus, or one or more components thereof. The table supports the workpiece in a manner suitable for cutting of the workpiece by the gas-driven cutting apparatus, which forces hot gases in a downward direction into the table while cutting the workpiece. The table includes an open table top having a plurality of openings for receiving the forced hot gases and a plurality of distributed horizontally arranged contact points for supporting the workpiece. The openings are distributed throughout the open table top independently of the cutting paths of the gas-driven cutting apparatus. The table further includes a stationary negative pressure cheer, situated below the table top and coupled to each of the openings. A ventilation and filtering system is provided for the table and includes at least one duct, at least one fan, and at least one filter. At least one duct has an air input terminating within the negative pressure chamber and forms an air passage that extends from the negative pressure chamber to the fan and the filter.

The negative pressure chamber provided within the table may have a sealed lower portion for containing a nonflammable liquid underneath each of the openings that are distributed throughout the open table top. The gas-driven cutting apparatus may comprise an oxyfuel cutting apparatus and/or a plasma-arc cutting apparatus. The fan and the filter may each be mounted externally to the table or they may be integrally mounted within the table.

In accordance with a further aspect of the present invention, the table may further include a plurality of vertically arranged slats having longitudinal axes extending across the open table top. In this regard, the slats may be distributed along the table top and form in part the openings in the open table top. The table may further comprise a plurality of horizontally extending members each placed between a pair of slats. The plurality of horizontally extending members may together form downwardly angled upper surfaces that partially close off each of the openings. The downwardly angled upper surfaces each have a lower terminating end that forms a restricted opening in direct contact with the inside of a negative pressure chamber. In this regard, the horizontally extending members may include members having a cross section shaped substantially in the form of an inverted V. The apparatus may further include an adjustment mechanism for adjusting the size of the restricted opening that is formed by each of the horizontally extending members.

In accordance with a particular aspect of the present invention, the horizontally extending members may include two side members and a hinge that connects the side members to each other. The adjusting mechanism may comprise a device for changing the angle of the downwardly angled upper surfaces by moving the two side members in relation to each other. In the alternative, the adjusting mechanism may include a device for adjusting the height of the horizontally extending members in relation to a bottom of the slats.

In accordance with a further aspect of the present invention, each of the horizontally extending members is fixed in shape and is mounted within the open table top between a pair of slats at a fixed height in relation to the bottom of the slats.

In accordance with yet a further aspect of the present invention, each of the horizontally .extending members comprises a slot for removably holding one of the slats.

As noted above, the negative pressure chamber may be provided with a sealed lower portion for holding non-flammable liquid, which may be water. A further mechanism may be provided for maintaining the level of the liquid to be within a predetermined desired range of levels. In this regard, a tray may be provided and a mechanism may be provided for positioning the tray between one of at least two positions, including a first position below the predetermined desired range of liquid levels and a second position that is above the predetermined desired range of liquid levels.

The above listed and other objects, features, and advantages of the present invention will be more fully set forth hereinafter.

BRIEF DESCRIPTION OF THE DRAWINGS

The present invention is further described in the detailed description which follows, by reference to the noted plurality of drawings by way of non-limiting examples of preferred embodiments of the present invention, in which like reference numerals represent similar parts throughout the several views of the drawings, and wherein:

FIG. 4 is an overall side view of a flame cutting table, a workpiece, a gas-driven cutting apparatus, and a filtration system;

FIG. 5 is a cut-away front view of a flame cutting table such as that illustrated in FIG. 1, depicting a dividing wall between two main chambers of the cutting table, and ducts which are provided for each of the chambers;

FIG. 6 is an overall illustration of the water level provided in the flame cutting table along with an external tank and a mechanism for maintaining the water level in the flame cutting table within a predetermined desired range of levels;

FIG. 7 is a front view of the water table illustrated in FIG. 1, with a first embodiment duct system;

FIG. 8 is front view of the water table illustrated in FIG. 1, with a second embodiment duct system;

FIG. 9 is a perspective cut-away view of the duct work provided in the embodiment illustrated in FIG. 8.

FIGS. 17A, 17B, 17C and 17D illustrate various views of a channeling baffle in connection with a cam shaft and a lever handle which together facilitate the adjustment of the height of the channeling baffle;

FIGS. 18A, 18B, 18C illustrate various embodiments of a mechanism for adjusting the angle between two hinged side members that form a channeling baffle; and FIG. 19 is a perspective drawing which illustrates a ventilation and filtering system integrally mounted within a flame cutting table.

DETAILED DESCRIPTION OF THE ILLUSTRATED EMBODIMENTS

Figure 1:
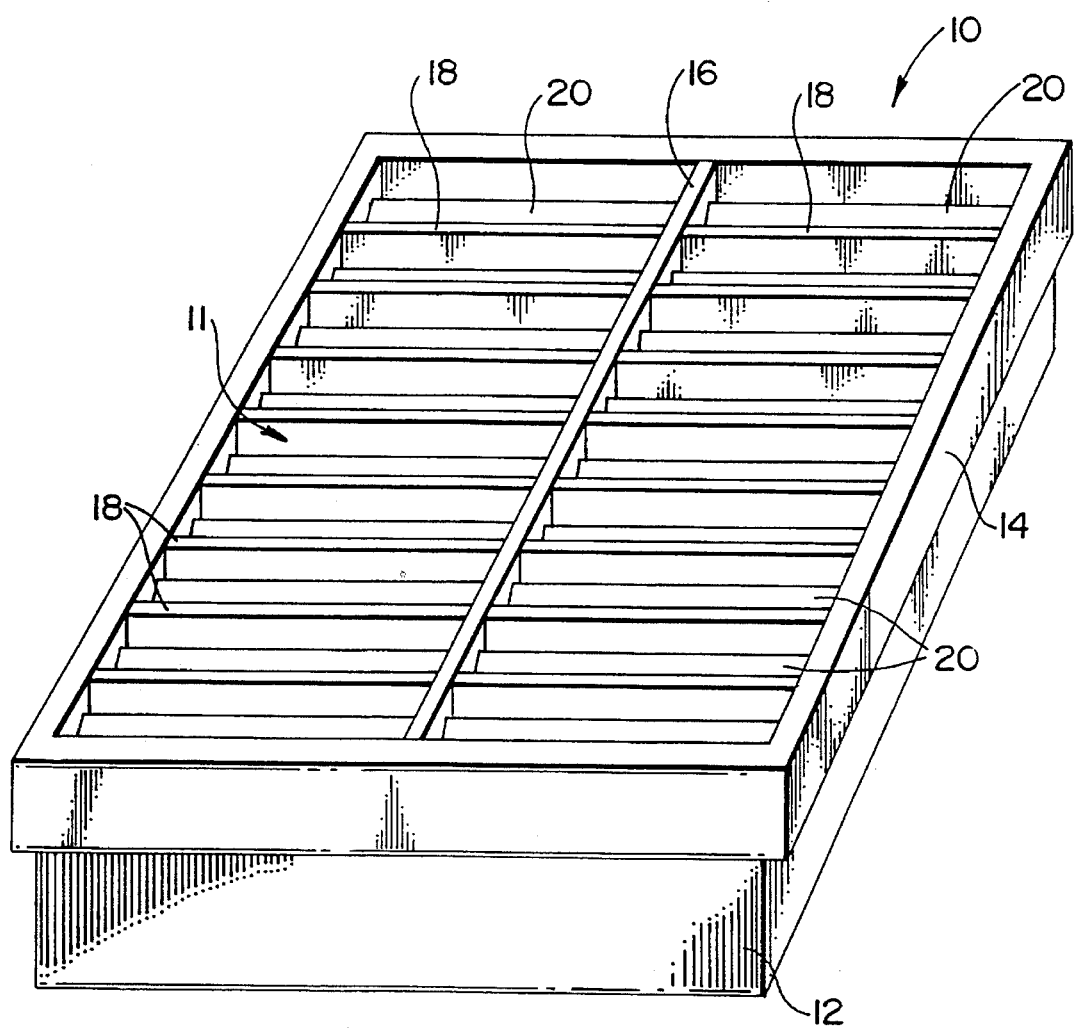
FIG. 1 is a simplified elevated perspective view of a particular illustrated embodiment flame cutting table which has both vertically arranged distributed slats and inverted V-shaped horizontally extending members provided between the slats.

Referring now to the drawings in greater detail, FIG. 1 illustrates, in an elevated perspective view, a stationary water table 10. As can be seen in FIG. 1, water table 10 includes a table base 12 which supports an upper frame 14. A plurality of vertically arranged slats (support members) 18 are provided which have longitudinal axes that extend across an open table top 11 defined within upper frame 14. A central dividing wall 16 is provided which upwardly extends from the bottom of the table (not shown in FIG. 1). Stationary water table 10 further comprises a plurality of horizontally extending members (channeling baffles) 20 placed within the spaces that are formed between vertically arranged slats 18 that are distributed throughout the surface area of open table top 11. More specifically, a plurality of slats are distributed from the front of table 10 to the back of table 10 along each side of a central dividing wall 16 to form a plurality of consecutively lined rectangular open spaces on each side of wall 16. Each such space is provided with a channeling baffle 20. Each channeling baffle 20 has one or more downwardly angled upper surfaces that partially close off each of the rectangular openings. The resulting downwardly angled upper surfaces of the channeling baffles each have a lower terminating end that forms a restricted opening (not seen in FIG. 1) that is in direct contact with a negative pressure chamber that is formed within water table 10. The downwardly angled upper surfaces that are formed by channeling baffles 20 serve to channel gases and other particulate matter that is forced into the table toward the restricted openings which lead into the negative pressure chamber. Because of the manner in which the channeling baffles restrict the opening entering into the negative pressure chamber, they further serve to "baffle" the flow of air into the negative pressure chamber.

Figure 2:
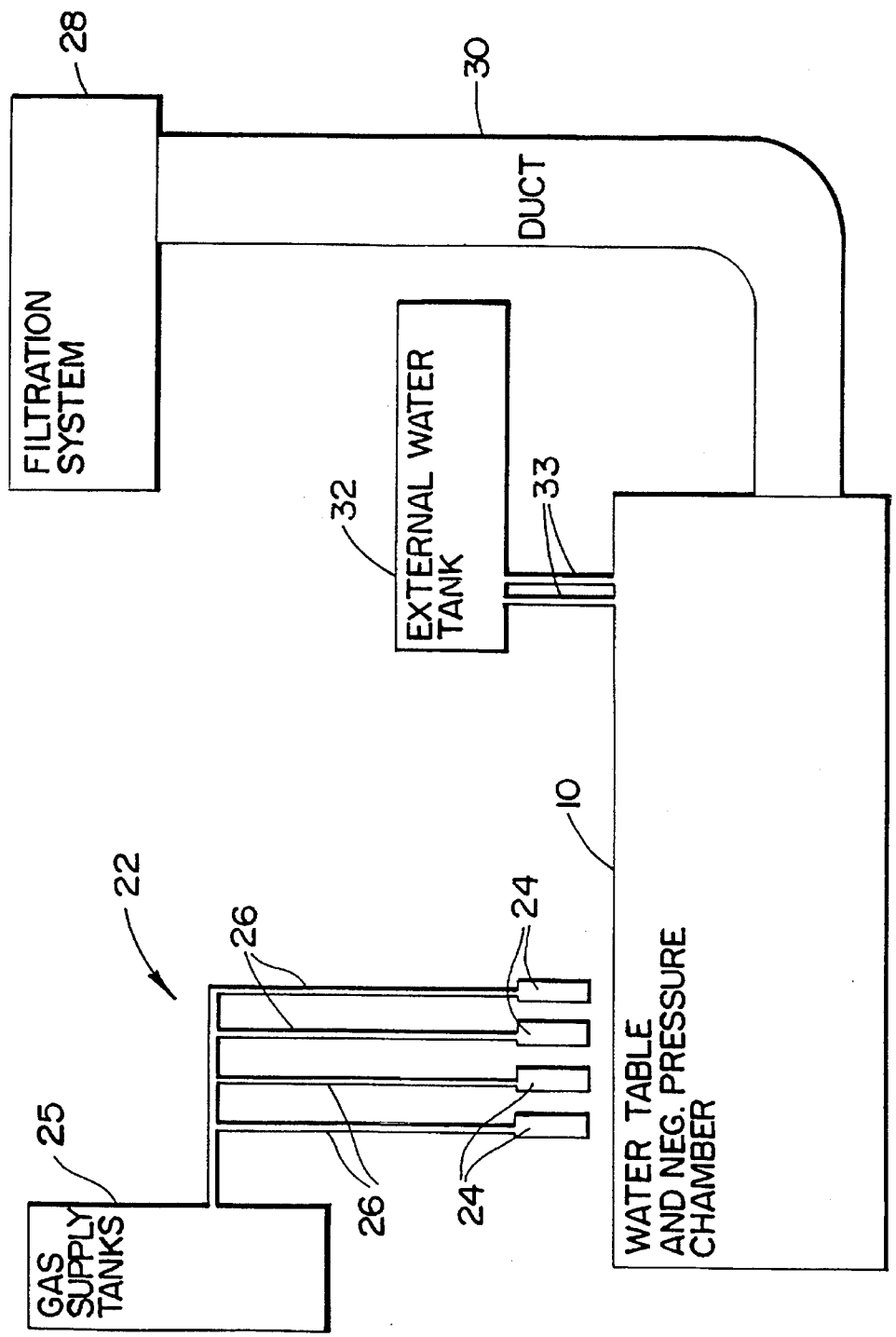
FIG. 2 is an overall diagram of a gas-driven cutting apparatus, a flame cutting table, and an airflow system.

FIG. 2 is an overall simplified block diagram of a stationary water table 10 with a negative pressure chamber provided in connection with a gas-driven cutting apparatus 22. A filtration system 28 and an external water tank 32 are each coupled to water table 10. Gas-driven cutting apparatus 22 includes gas supply tanks 25 which are coupled to a plurality of cutters 24 (e.g., torches or plasma cutting units) via gas supply lines 26. Filtration system 28 is connected to the negative pressure chamber of water table 10 via a duct 30. An external water tank 32 is provided which is connected to a sealed lower portion of a negative pressure chamber (not shown in FIG. 2) via ingoing and outgoing water lines 33.

Gas-driven cutting apparatus 22 may comprise an apparatus for performing manual and/or automatic cutting of workpiece materials. The cutting apparatus 22 may comprise a torch cutting apparatus for performing oxyfuel cutting or a plasma cutting apparatus for performing plasma-arc cutting. In the context of plasma-arc cutting, the apparatus may be a water-cooled or water-injection plasma-arc cutting apparatus, which has lower-current manual cutters (with power levels from 30A to 120A) and/or high-current automatic cutters (with power levels from 100A to 500A). The gas-driven cutting apparatus may include a oxyfuel cutting apparatus for cutting, manually and or by machine, with, e.g., oxyacetylene, oxy/natural gas, oxy/methylacetylene-propadiene, oxy/propylene, and oxy/propane.

Filtration system 28 may comprise one or more industrial air cleaners (e.g., one air cleaner for each side of dividing wall 16), such as the Tepco model M3000, STD or HE, (provided by Tepco of Trion, Inc.), 101 McNeill Road, P.O. Box 760, Sanford, N.C., 27331-0760 or a FRED ICS self-cleaning smoke and fume collector system (manufactured by DIVERSI-TECH, 8479 Dalton, Montreal, Quebec, Canada H4T 1V5, distributed by Ivey Industries, Inc., Springfield, Mass.). Each of these systems is capable of capturing contaminants at the source. However, these systems are only an example of filtration systems that may be utilized. Other filtration systems can be used in connection with the various embodiments disclosed herein and modifications thereof, without significantly departing from the present invention.

External water tank 32 is coupled, via ingoing and outgoing water lines 33, to a sealed lower portion of water table 10 which is designed to hold and maintain a non-flammable liquid (e.g., water) within a certain desired range of levels at the bottom of the water table. A switching mechanism may be provided along with water pumps in order to trigger the transfer of water from the water table to external water tank 32 when the water level exceeds a maximum desired level, and the transfer/return of water to table 10 from external water tank 32 when the water level in the table goes below a desired minimum level. Water pumps and limit switches may be provided in order to facilitate this operation.

Figure 3:
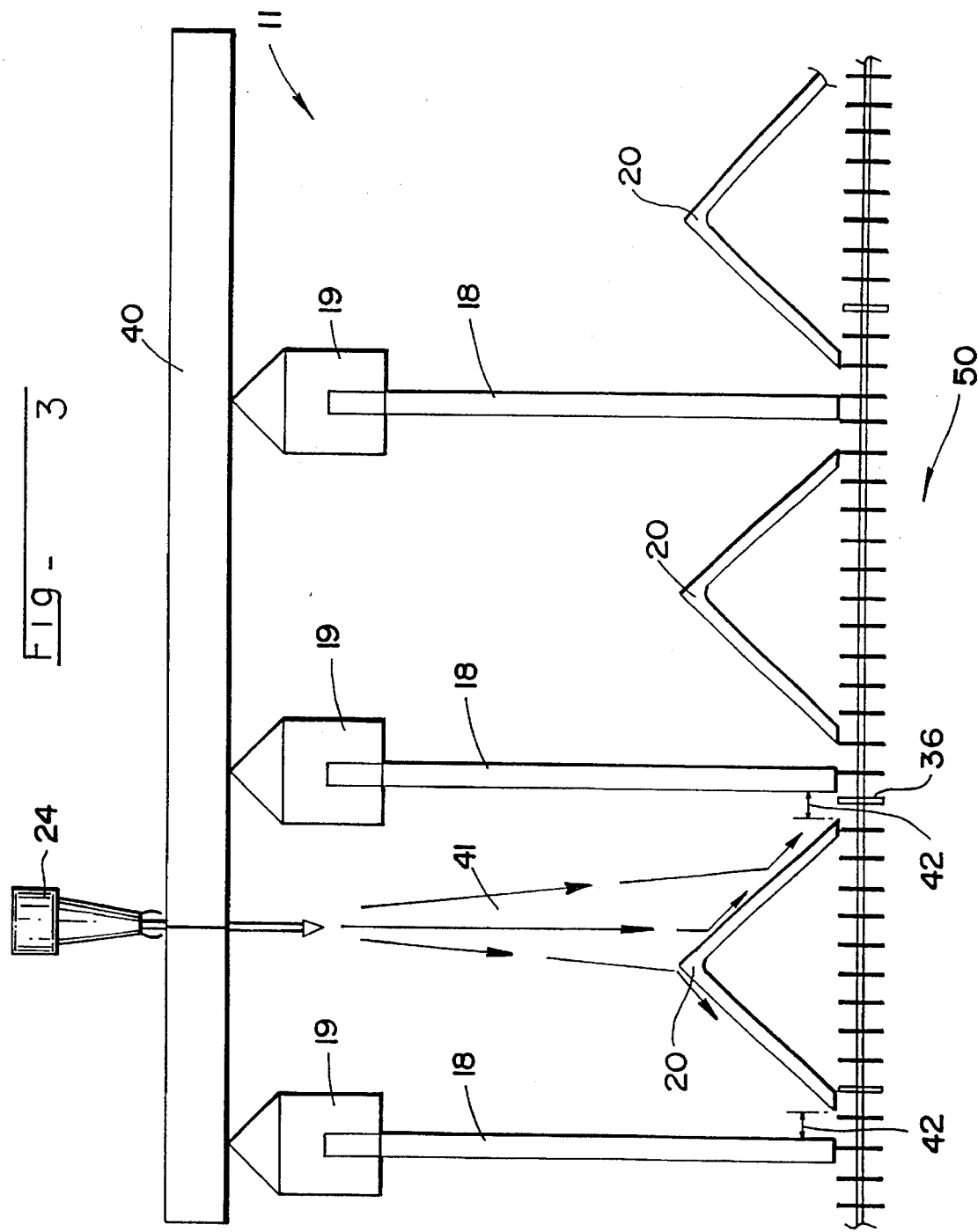
FIG. 3 is a cut-away view of a portion of the flame cutting table illustrated in FIG. 1, being shown while a cut is being performed on a workpiece.

FIG. 3 is a partial cut-away side view of the stationary water table 10 illustrated in FIG. 1, shown while a cutter 24 is cutting a workpiece 40. An end view is provided of a plurality of slats 18 along with several (3) channeling baffles 20 which are provided just above a grating 36. Grating 36 may optionally be provided in order to keep parts and debris from falling through into the negative pressure chamber which is provided below the grating. A number of slat protectors 19 are placed upon the top of slats 18 in order to form a plurality of distributed horizontally arranged contact points for supporting the workpiece. Slat protectors 19 serve to space workpiece 40 from slats 18 so that cutter 24 does not cut into and thus destroy any of the slats 18 during the cutting process. Such slat protectors are standard, may take many forms, and are commercially available.

As each cutter 24 cuts into workpiece 40 (only one cutter 24 is shown in FIG. 3), gases and contaminants 41 are driven downward at a specific pressure which is set in accordance with the thickness of workpiece 40 being cut. Channeling baffles 20 channel the gases and contaminants 41 laterally and downwardly toward a restricted opening 42 that is formed between a lower terminating end of channeling baffle 20 and an adjacently positioned member (which in this case is the bottom of a slat 18). Restricted opening 42 is in direct contact with a negative pressure chamber 50 which is positioned immediately below channeling baffles 20 and slats 19.

Baffles 20 further serve to "baffle" (i.e., restrict the flow) of air into negative pressure chamber 50, and thus serve to limit the flow of air (in addition to gases and contaminants 41) which is introduced into negative pressure chamber 50. If the flow of such supplemental air is too large, it will not be possible to maintain a sufficient level of negative pressure, unless the power of the ventilation fan is increased.

The negative pressure is maintained within negative pressure chamber 50 by removing air and gases from the chamber with use of filtration system 28 and an exhaust duct 30 as illustrated in FIG. 2 at a flow rate (CFM-cubic feet per minute) which is larger than the overall flow rate of gases and contaminants entering the chamber.

For the present disclosure, pressure is defined in terms of local atmospheric pressure, i.e., gauge pressure. The pressure of the air and gases inside of negative pressure chamber 50 is maintained below the local atmospheric pressure, and thus has a negative gauge pressure.

FIG. 4 is an overall view of stationary water table 10 in connection with cutting apparatus 22 and ventilation and filtering system 29. As shown in FIG. 4, slats 18 and outer side walls 17 together form a plurality of entrance cavities (upward openings) 43. Such entrance cavities 43 form open table top 11, and collect gases and particulate matter which are forced downward by cutter 24 through workpiece 40 during the cutting process. Channeling baffles 20 are placed inside and at the bottom of each of the entrance cavities 43, in a manner to form restricted openings 42 (see FIG. 3).

FIG. 5 illustrates a cut-away front view of a portion of a stationary water table 10, and includes a broad-side view of a channeling baffle 20 along with an end view of a cut-away pair of internal ducts 52 which run along each side of central dividing wall 16. A layer of slag 56 is formed at the bottom of the water table, and has a level that is below water level 57. The arrows illustrated in FIG. 5 show the general flow of gases and contaminants 41. Such gases and contaminants 41 eventually are drawn into one of more of a plurality of openings 54 that run along the side of each of internal ducts 52, as indicated by arrows B.

It is noted that the gases that are forced out of cutters 24 are extremely hot and are thus significantly lighter than the ambient air. Thus, absent the existence of a negative pressure chamber, such gases will typically rise above open table top 11 of stationary water table 10. However, a negative pressure chamber 50 provided on each side of central dividing wall 16 keeps the pressure level below open table top 11 negative and thus keeps such gases in the chamber until the exhaust flow produced by internal exhaust ducts 52 can absorb the gases and transport the same to filtration system 28 (see e.g., FIG. 4). The size of the negative pressure chamber 50 should be big enough so that it may hold all of the fumes and contaminants until which time as they can be filtered out. With a 10×15 foot water table, each negative pressure table may, e.g., occupy 150–200 cubic feet of space. The air, contaminants, and gases are removed by internal exhaust ducts 52 which are connected to a filtration system which generates an exhaust force in the longitudinal direction of ducts 52. The exhaust force may be in the direction of arrows C. The exhaust force may be set to 1800 CFM for each internal duct (one duct per chamber) for a 10×15 foot water table having two chambers, when oxyacetylene cutting is being performed at 120 psi with four torches.

Each of the various diagrams illustrated herein is not precisely to scale, and has been presented in a simplified fashion. For example, FIG. 1 shows slats 18 having a large thickness in comparison to the rest of the table. The thickness of slats 18 may be modified in order to modify or improve the performance of the stationary water table, and to prevent the excessive deflection of gases and contaminants off the top surfaces of slats 18, which might cause gases and contaminants to be hurled into the air surrounding the work area.

Each of internal exhaust ducts 52 includes a roof member 53 and a lower L-shaped wall 55. Each of these members runs along the entire length of the water table and is abutted against dividing wall 16 located at the center of the water table. It should be appreciated that the exhaust ducts 52 may be implemented in different manners as long as sufficient negative pressure is generated within chamber 50, thus allowing the contaminants and gases present within the chamber to be removed therefrom and routed to an appropriate filtration system. Thus, variations of the exhaust duct system may be made without departing from the overall functions that the exhaust duct system is intended to perform. The ducts should be made from materials (such as sheet metal) than can withstand high temperatures.

FIG. 6 is an overall simplified diagram of the outer walls and floors of water table 10 and external water tank 32. A desired water level 57 is maintained within a lower sealed portion of water table 10 by the use of a water level control system 58. Water level control system 58 includes a removal line 60 which is connected between a water pump 64 provided at the bottom of water table 10 and an external tank input location. When water pump 64 is operated, removal line 60 transfers the water from the water table 10 to external water tank 32. An add line 62 is connected between a water pump 65 which is at the bottom of external water tank 32 to water table 10, and transfers water back into the water table 10. Limit switches 66, 68 are provided in order to monitor the level of the water. The outputs of limit switches 66, 68 can be used to control each water pump 64, 65 in a manner so as to maintain water level 57 within a certain desired range of levels. The ranges of levels may be determined in accordance with the positioning of limit switches 66, 68. For example, limit switch 66 may be placed at a lower level in order to indicate when the water reaches a minimum desired level (e.g., 2 inches), and limit switch 68 may be placed at a higher position so that it can detect when the water level reaches a maximum desired level (e.g., 4 inches or at a position just below the input openings in the internal ducts).

Sheet metal deflector plates (e.g., 45 degree angled roof members) may be provided to protect the limit switches and pumps from slag and other debris. In addition, a screen may be used to keep slag and other debris from the switches and pumps. The water tank 32 need not be external, but rather may be built into water table 10, e.g., into outer side walls 17 or central dividing wall 16. Rather than reusing the same water as in the illustrated embodiment, a drain may be provided for eliminating used water that is pumped out of table 10, and only clean/unused water may be pumped into table 10 in order to raise the water level. If water is reused, and repumped back into water table 10, a filter may be used to clean the same.

FIG. 7 illustrates a simplified front view of water table 10 with internal exhaust ducts 52 being viewable from an end position. FIG. 7 illustrates a first example embodiment of the internal duct system which may be utilized in connection with the filtration and exhaust system 29 (see, e.g., FIG. 4). Each of internal exhaust ducts 52 is at a level significantly above the water level line in order to prevent the possibility of water leaking into the exhaust system.

FIG. 8 is another example of internal exhaust ducts 52 that may be provided for each of the chambers within water table 10. Each internal exhaust duct 52 is located along an outer side of water table 10 and runs along the side from one end of the water table to the other. They are also located above the water level and include a slanted roof member 53 (slanted at 45 degrees) and a lower L-shaped wall 55. FIG. 9 is a breakaway view of an internal exhaust duct 52, which is shown, by way of example, to be against an outer wall 17 of the water table. The internal duct illustrated in FIG. 9 includes a slanted roof 53 and a lower L-shaped wall 55. The view shown in FIG. 9 clearly illustrates the provision of the plurality of openings 54 at a top portion of the L-shaped wall just underneath the part of slanted roof 53 that extends beyond the vertical portion of L-shaped wall 55. Such openings may be in several different forms, and do not have to be shaped as specifically illustrated in FIG. 9. For example, openings 54 may be rectangular, circular, or any other odd shape. The exhaust ducts and openings should be designed in order to maximize the air flow (with minimum drag) from inside the chamber toward the exhaust part of a filtration system.

Figure 10:
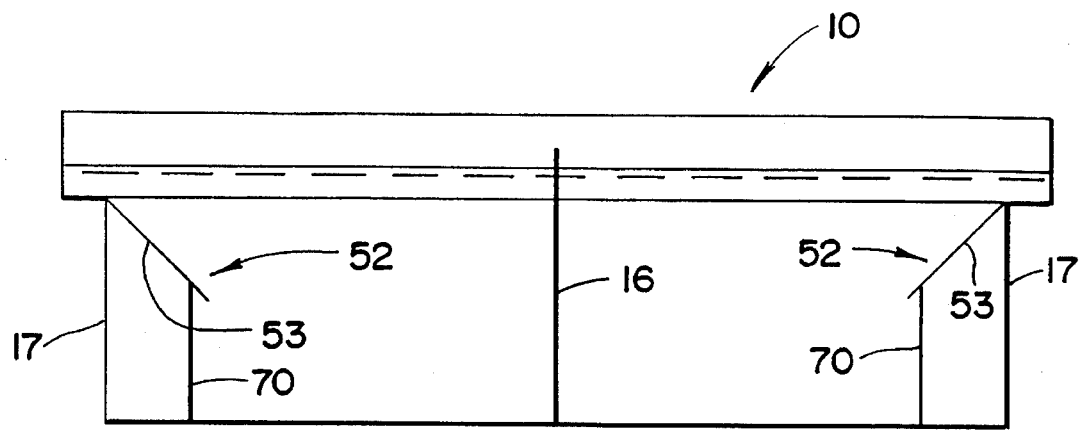
FIG. 10 is a front view of the illustrated water table with a third embodiment duct system.

FIG. 10 illustrates yet another embodiment of internal exhaust ducts 52 provided for each of two illustrated chambers of water table 10. Each internal exhaust duct 52 includes a slanted roof member 53 (slanted at 45 degrees) and a vertical wall 70 which extends from the floor of water table 10 up to slanted roof member 53. A plurality of holes/openings are provided in an upper portion of vertical wall 70 just underneath slanted roof 53, e.g., in the manner as illustrated in FIG. 9. By providing the vertical walls of the exhaust ducts in the manner illustrated in FIG. 10, i.e., from the floor up to the slanted roof members 53, outer walls 17 are strengthened. Thus, thinner and less expensive material may be used to form outer walls 17 of water table 10.

Figure 11:
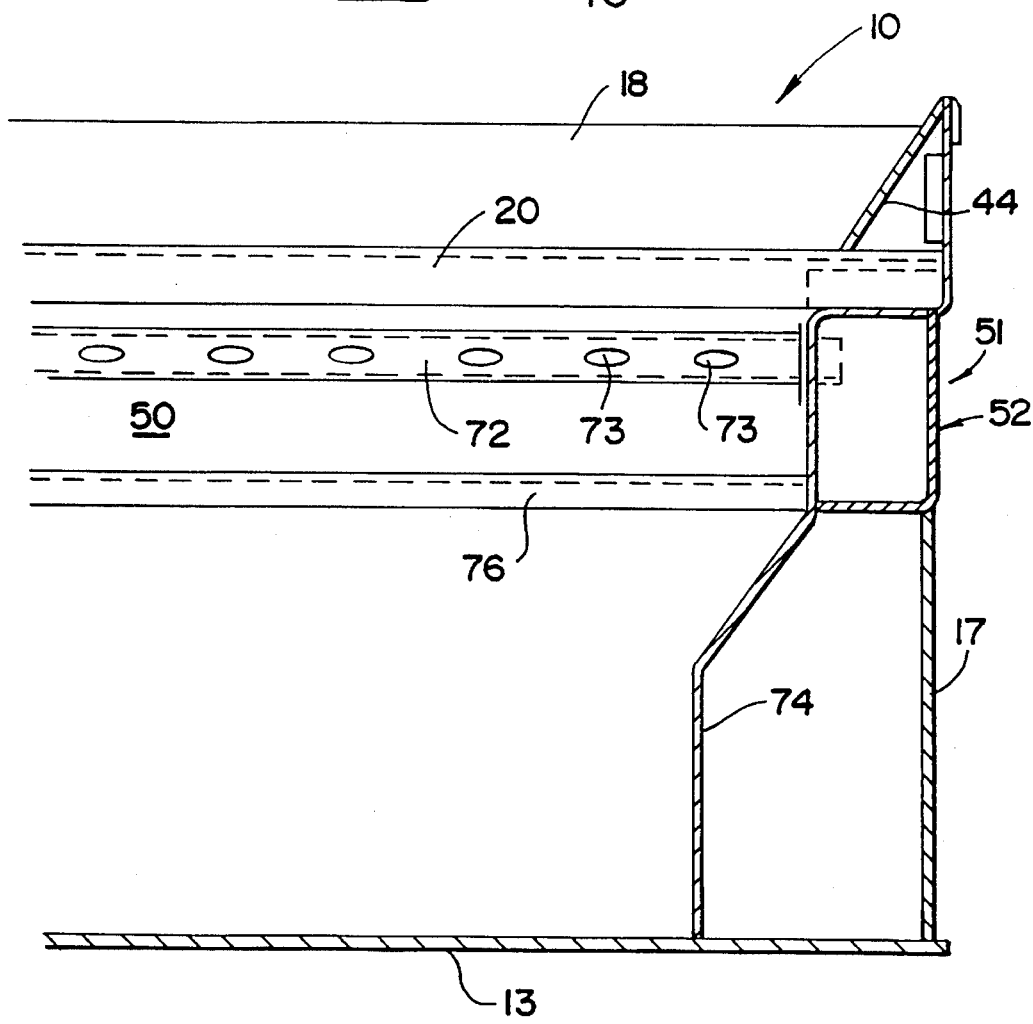
FIG. 11 is a side view of a fourth embodiment duct system.

FIG. 11 illustrates yet another example configuration or embodiment of exhaust ducts 52 that may be provided in order to create an exhaust flow from the inner negative pressure chamber 50 outward to an exhaust part of ventilation and filtration system 29 (see, e.g., FIG. 4). An internal exhaust system 51 may be configured to include internal exhaust ducts 52 that run along each side 17 of water table 10, along with a laterally positioned longitudinal air duct tube 72 (having a diameter of, e.g., 2 inches) coupled to an exhaust duct 52 which may be provided directly under each channeling baffle 20. A side deflector 44 may be provided which extends from a top of one side of the water table down to a position just above channeling baffle 20 and internal exhaust duct 52, in order to direct contaminants and gases produced during the cutting process inwardly so that they do not collect above internal exhaust ducts 52. A gusset 74 (e.g., made of ⅜ inch plate) may be utilized as a reinforcing member that extends from floor 13 of water table 10 up to a bottom portion of internal exhaust duct 52. An additional angle side stiffener 76 may be provided which extends from outer side wall 17 (or from an inner side of internal exhaust duct 52) to central dividing wall 16 (not shown in FIG. 11), in order to further reinforce (i.e., stiffen) water table 10. Different, additional, or alternative reinforcing members and plates may be provided throughout the water table in order to ensure that the water table is sufficiently reinforced and can handle all forces incident to normal use without becoming damaged. For purposes of generating an outgoing exhaust flow of air and gases, exhaust air duct tube 72 is provided with a plurality of openings 73 on each side thereof. Thus, for each opening shown in FIG. 11, there is an identical opening (not visible in drawing) on the other side of tube 72. These openings allow the gases, fumes, and other contaminating particles to be sucked from each side of an inverted V-shaped channeling baffle 20 as such gases and particles are being forced down into negative pressure chamber 50 by one or more the cutting units.

FIGS. 12A–12K illustrate several variations of channeling baffles 20. While slats 18 are illustrated along with each of the channeling baffles illustrated, this is not to preclude the provision of an alternate support mechanism for supporting the workpiece over open table top 11 while the workpiece is being cut by a flame cutting apparatus.

Figure 12A:
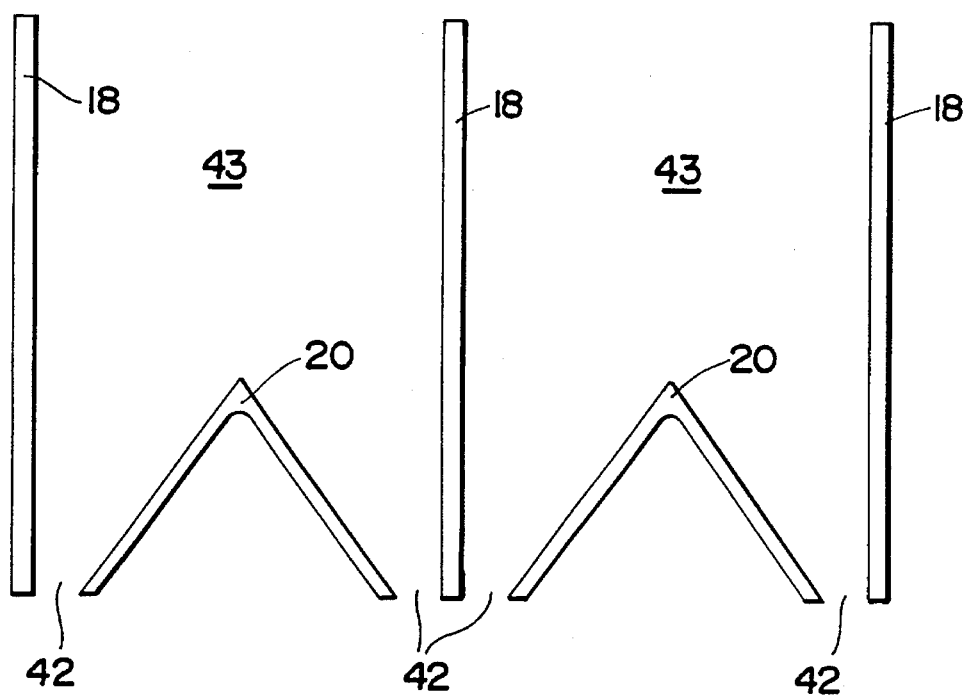
FIGS. 12A, 12B, 12C, 12D, 12E, 12F, 12G, 12H, 12I, 12J and 12K illustrate various embodiments and positions of channeling baffles.

FIG. 12A illustrates an end view of several slats 18, which form entrance cavities 43, and a channeling baffle 20 is provided in a lower portion of each entrance cavity 43, in order to form openings 42 with lower terminating ends of channel baffles 20 and bottom portions of slats 18. The lateral dimension of each restricted opening 42 is defined by the position of each respective fixed-shape channeling baffle 20. The channeling baffles 20 illustrated in FIG. 12A may comprise commercially available angle irons cut to an appropriate length. Such angle irons may be assembled into the water table by simply placing them on top of a grating (not shown in FIG. 12A), without any specific type of fascinating mechanism utilized to position the same. This facilitates the easy removal of the angle irons for clean up of slag and other matter that is gathered on the grating of the water table during use.

Figure 12B:
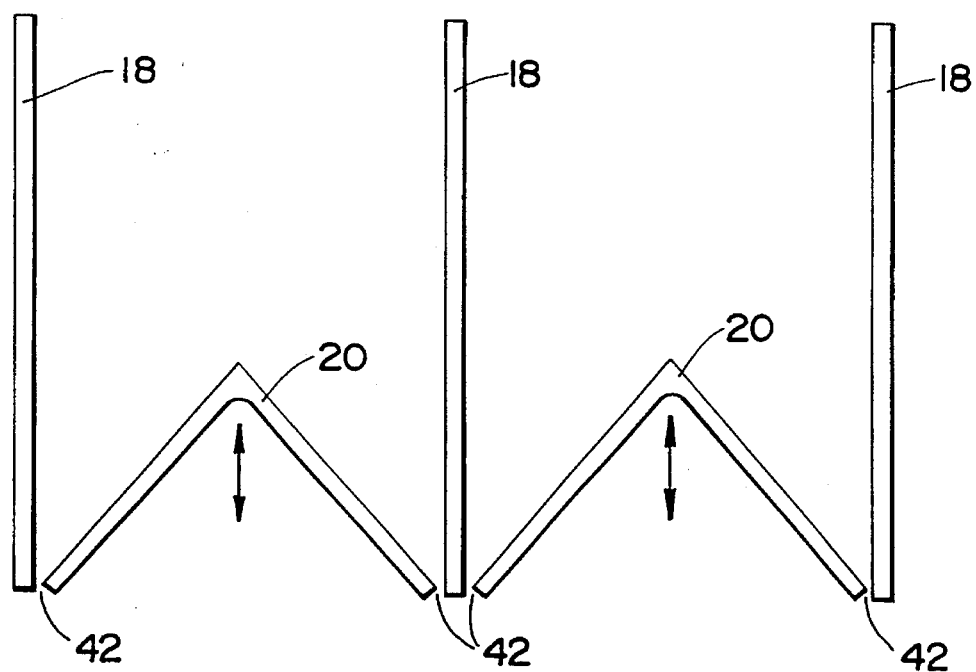
Figure 12C:
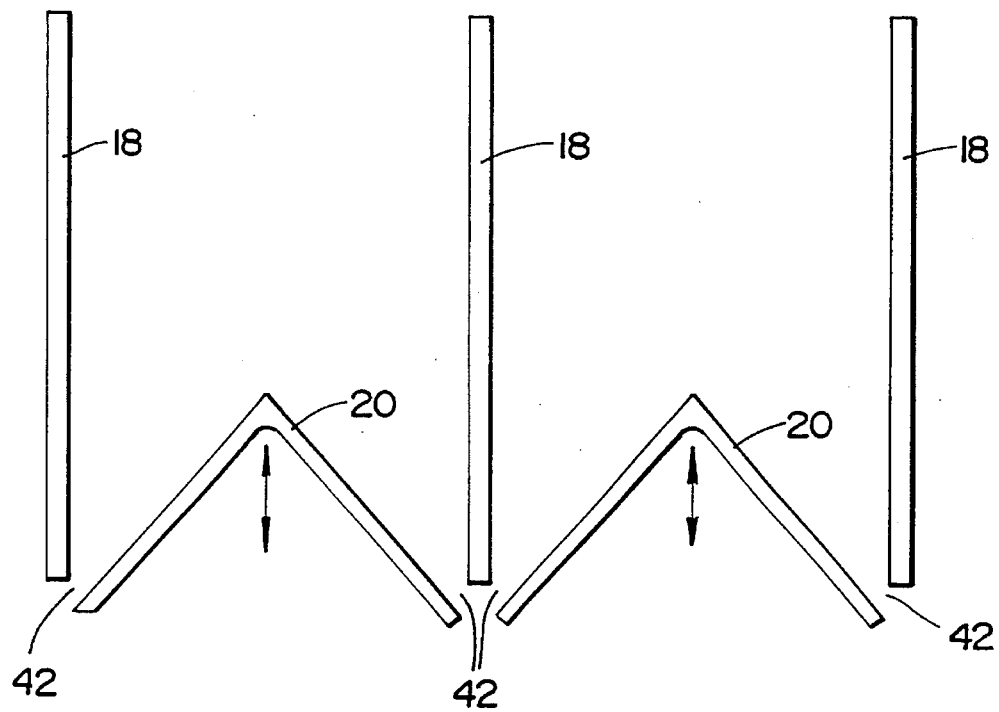

FIGS. 12B and 12C illustrate adjustable fixed-shape channel baffles 20, the vertical positions of which may be adjusted in order to adjust the respective sizes of the openings that are formed between the terminating lower ends of the channeling baffles 20 and their adjacent members (the bottom portions of slats 18). As indicated by the directional arrows in each of these figures, each channeling baffle 20 may be adjusted vertically. In FIG. 12B, the position of each channeling baffle 20 has been raised, thus substantially closing off the openings 42. In FIG. 12C, each channeling baffle 20 has been lowered, thus resulting in an increased restricted opening 42. A manual or automated adjustment mechanism may be provided for adjusting the height of fixed-shaped channeling baffles 20 in order to thereby adjust the sizes of openings 42.

An adjustment mechanism may be provided which is controlled by an operator, or which is automatically controlled in accordance with various parameters, such as the thickness of the workpiece to be cut. An example adjustment mechanism will be specifically described below.

Figure 12D:
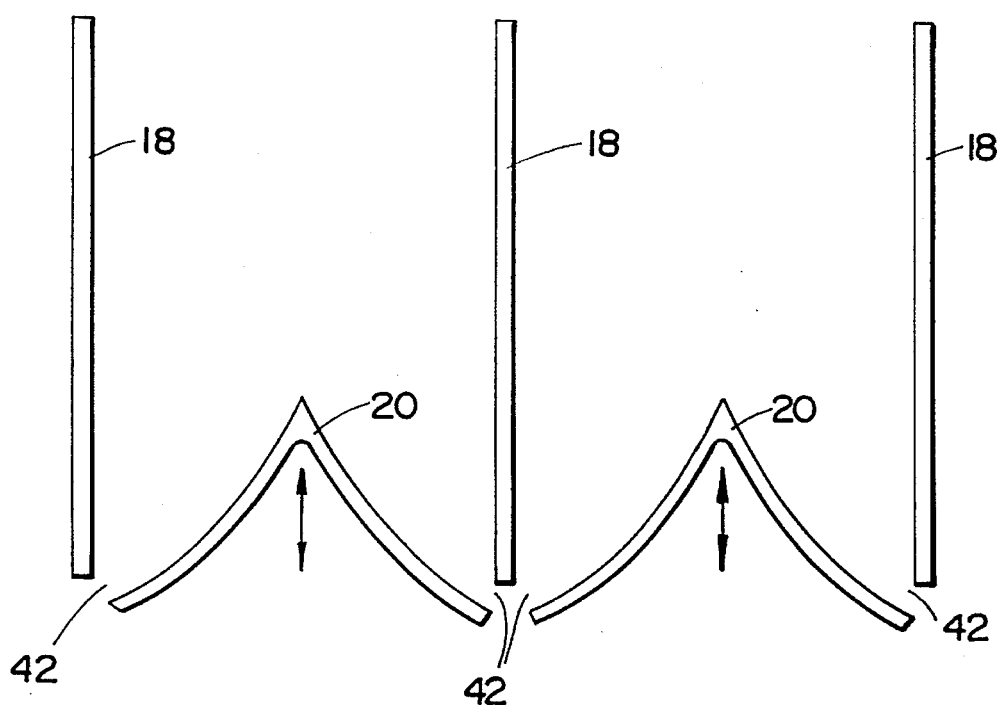
Figure 12E:
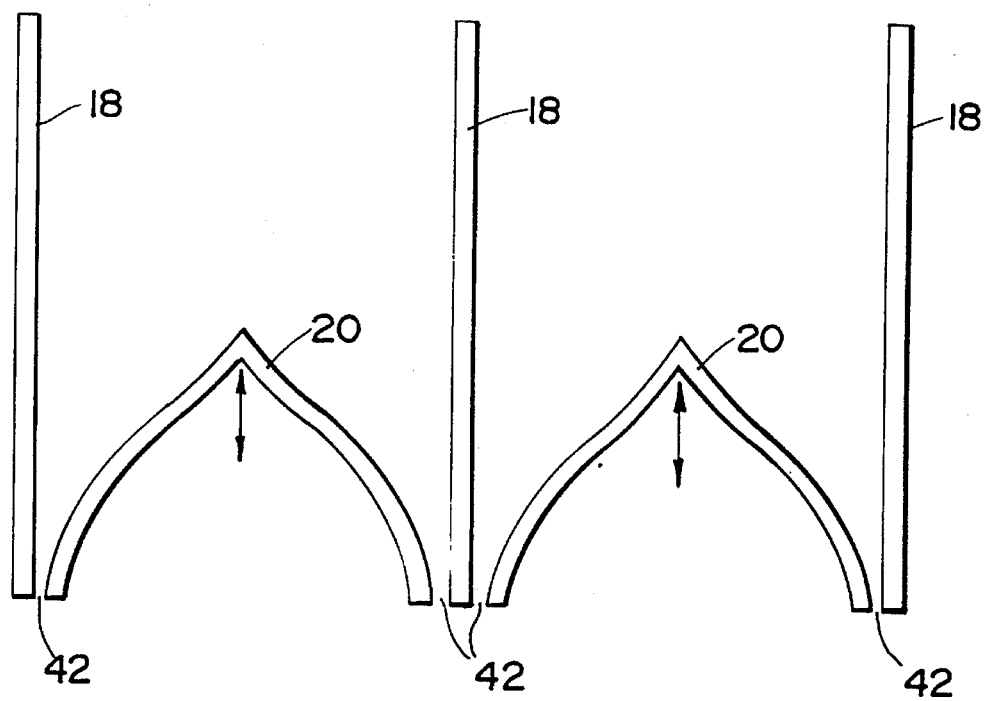
Figure 12F:
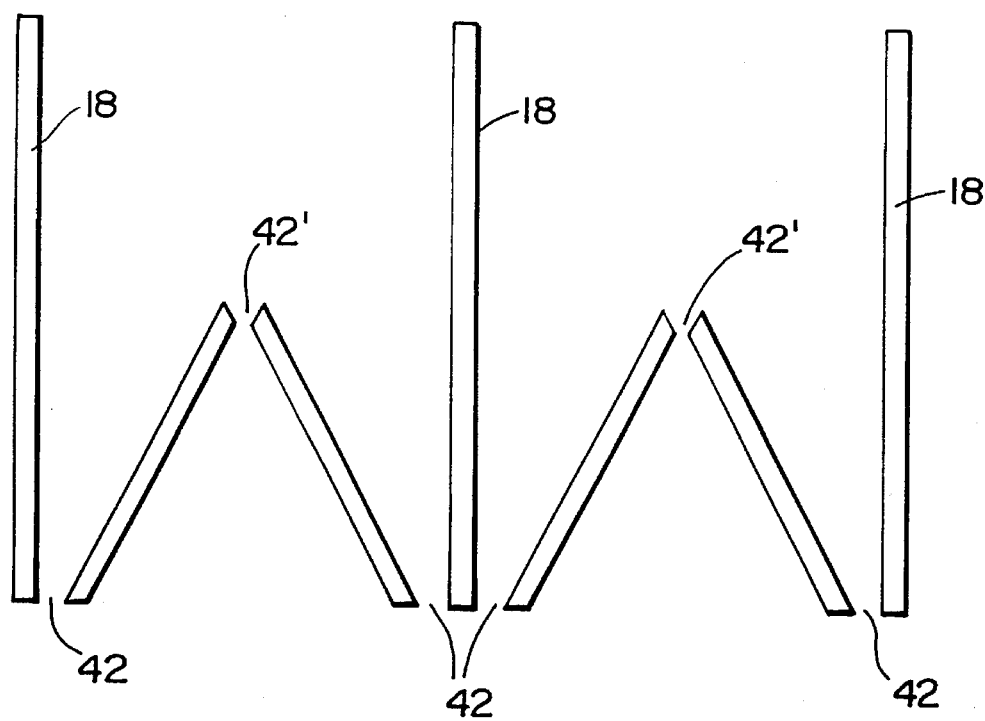

Channeling baffles 20 have been described so far as comprising substantially inverted V-shaped members, having substantially straight downwardly angled upper surfaces that partially close off each of the entrance cavities. The inverted V-shaped channeling baffles 20 discussed above may comprise, e.g., angle irons. They may be permanently fixed in position, vertically adjustable, or they may be simply placed on top of a grating (see, e.g., grating 36 in FIG. 3). However, the cross-sectional shape of channeling baffles 20 is not limited to the precise shapes illustrated in FIGS. 3 and 12A–12C. Rather, channeling baffles 20 may have cross-sectional shapes of various forms as long as they sufficiently channel the gases and contaminated matter that is generated by the cutters in a downward fashion toward a restricted opening which is in direct contact with a negative pressure chamber that is below the open table top. By way of example, FIGS. 12D–12K illustrate some variations of the cross-sectional shape and configuration of channeling baffles 20. FIG. 12D shows channeling baffles 20 with downwardly angled upper surfaces in the form of a tent. FIG. 12E shows channeling baffles 20 with downwardly angled upper surfaces that form a wishbone shape. FIG. 12F illustrates channeling baffles 20 which each comprise a pair of unconnected angled members. The pair of angled members form downwardly angled upper surfaces having respective upper terminating ends that form a restricted opening therebetween, and also having respective lower terminating ends that form a restricted opening with an adjacent member such as a bottom portion of a slat 18. Each of channeling baffles 20 illustrated in FIGS. 12D and 12E may be designed so that the vertical position of the same is adjustable, thereby allowing each restricted opening 42 to be adjusted. For example, in FIG. 12D, tent-shaped channeling baffles 20 are in a lower position resulting in a substantially open restricted opening 42, while, in FIG. 12E, wishbone-shaped channeling baffles 20 are in an upper position resulting in a substantially closed restricted opening 42.

Figure 12G:
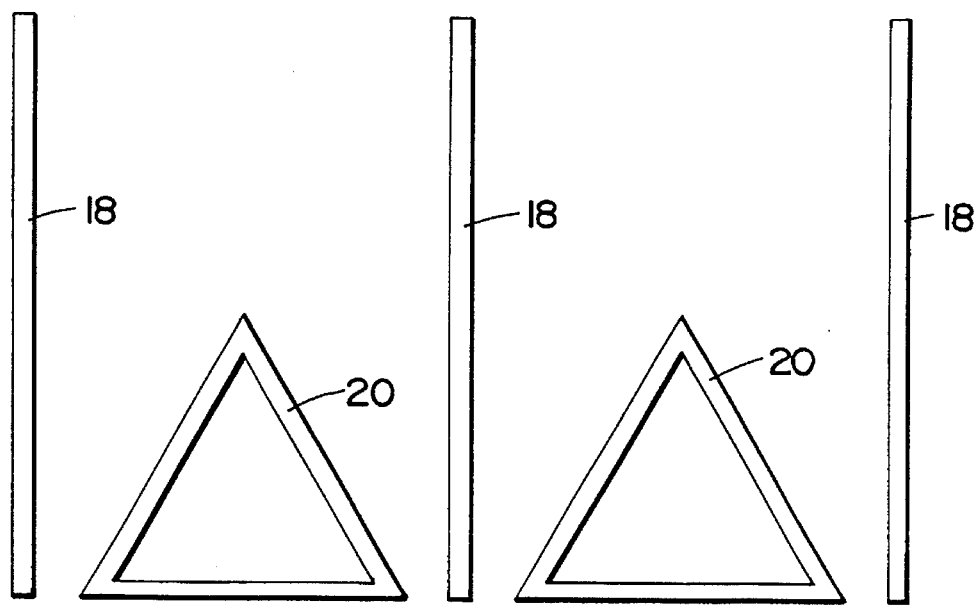
Figure 12H:
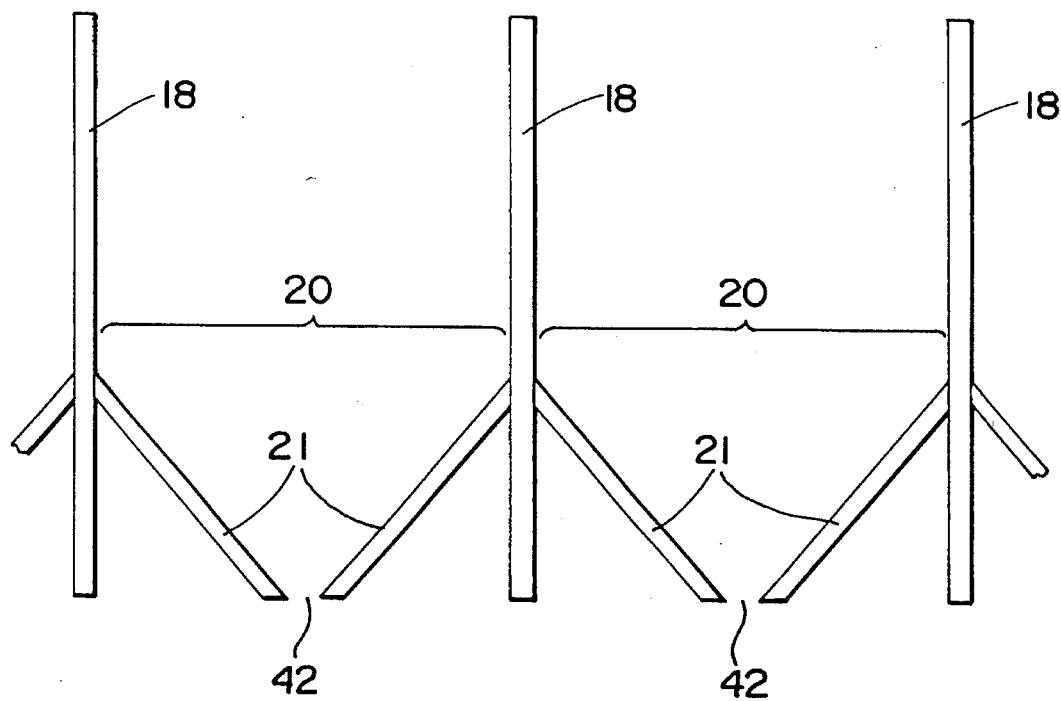
Figure 12I:
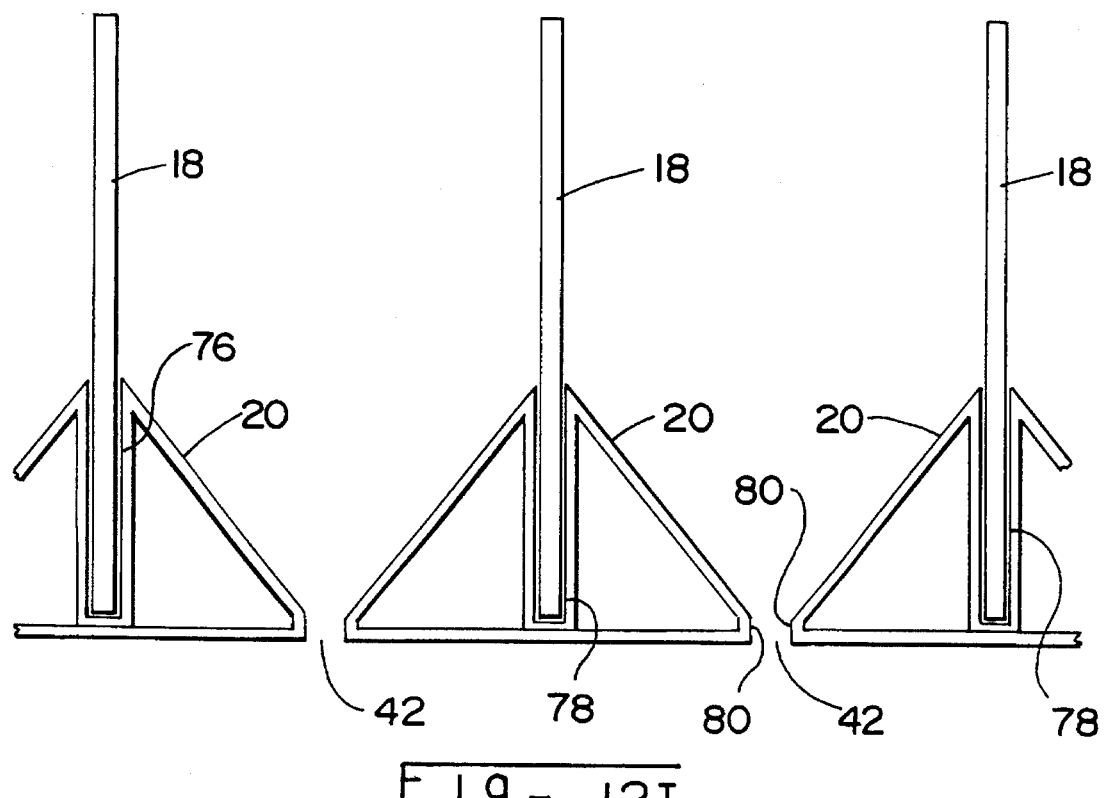
Figure 12J:
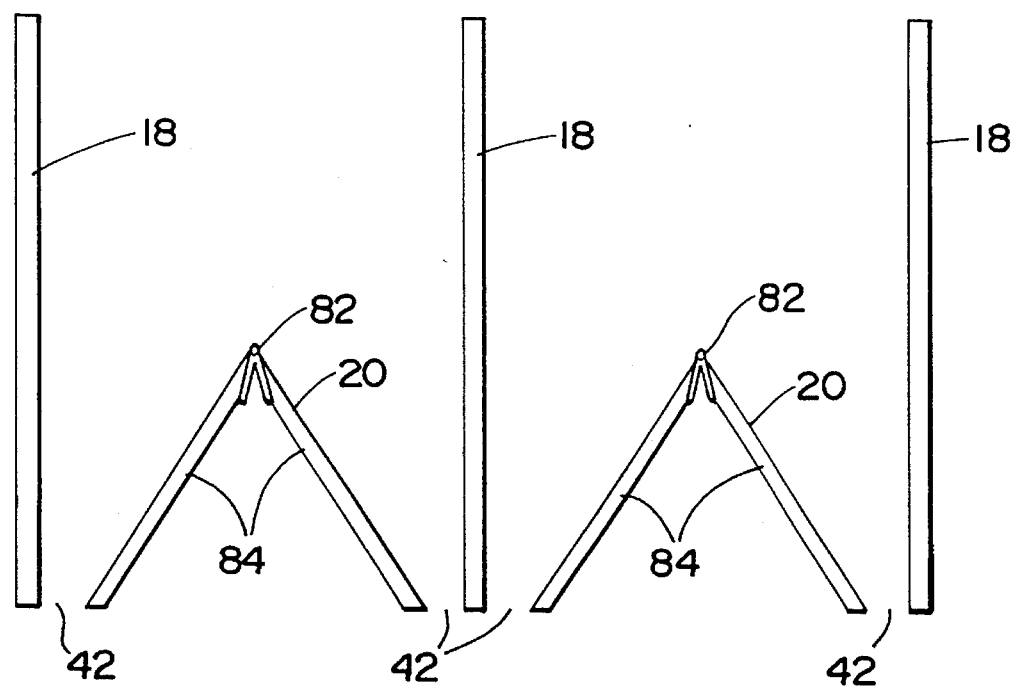

FIG. 12G illustrates an additional embodiment of channeling baffles 20, where each of channeling baffles 20 is configured to have a triangle shape cross-section. In FIG. 12H, each channeling baffle 20 is formed by two separate downwardly angled members 21 which are connected to a slat 18. Each of downwardly angled members 21 is connected at one end to a slat 18 and extends downward to a lower terminating end that forms a restricted opening 42 with an adjacent member (i.e., an adjacent downwardly angled member 21). FIG. 12I illustrates a plurality of channeling baffles 20 which are each shaped to have a slot 78 that extends horizontally across the open top of the table, whereby a slat 18 may be removably inserted into each slot 78. Slots 78 are formed in a central portion of each triangular shaped channeling baffle 20. Each downwardly angled side of each channeling baffle 20 has a terminating end 80 which forms a restricted opening 42. FIG. 12J illustrates an end view of another embodiment of channeling baffle 20. Each channeling baffle 20 comprises two side members 84 and a hinge 82 connecting side members 84 to each other. The angle between the side members 84 of each channeling baffle 20 may be adjusted by rotating the side members about hinge 82, thereby increasing or decreasing the sizes of openings 42.

Figure 12K:
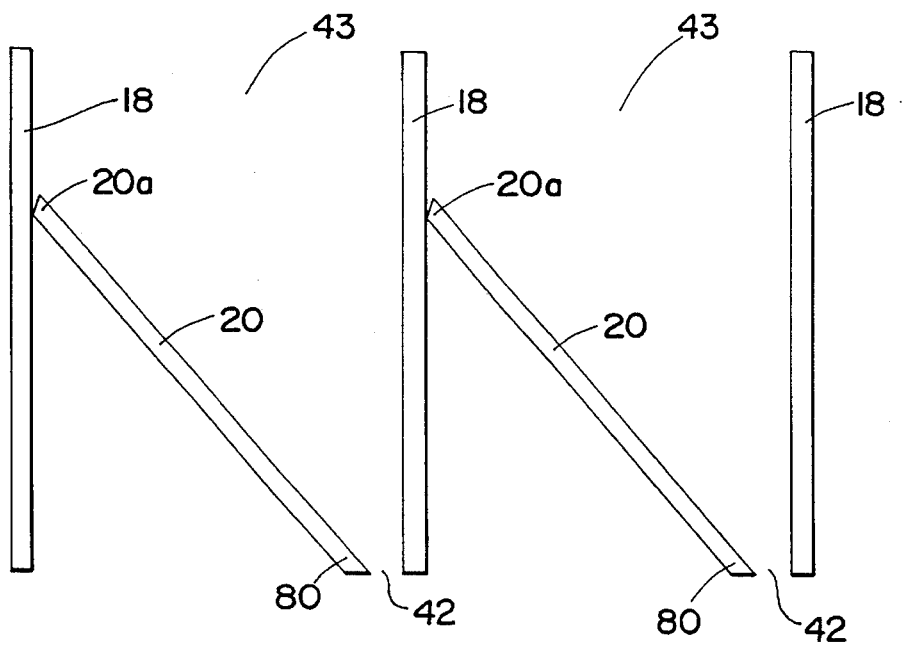

FIG. 12K illustrates an additional embodiment of channeling baffles 20, where each of channeling baffles 20 comprises a single downwardly sloped substantially flat member 20. Each channeling baffle 20 has a terminating end 80 which forms a restricted opening 42 together with an adjacent slat 80. Each channeling baffle 20 has an upper end 20a which may be fixed to a respective slat 18, or may be connected to slat 18 via a hinge mechanism (not shown) which would allow an adjustment of the angle of channeling baffle 20 in order to adjust the size of restricted opening 42. In the alternative, upper end 20a of each channeling baffle 20 in FIG. 12K may be spaced from its adjacent slat 18 and may thus form an upper restricted opening between the upper ends 20a and each slat 18.

Figure 13:
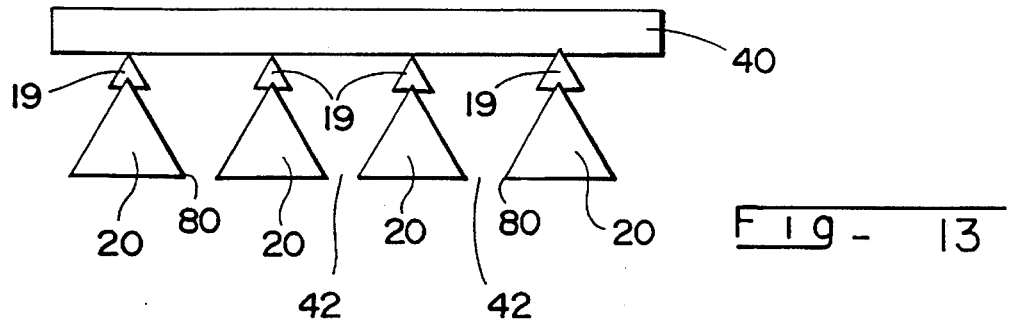
FIG. 13 illustrates an open table top of a flame cutting table which includes channeling baffles without the use of slats provided therebetween.

FIG. 13 illustrates yet a further variation/embodiment of channeling baffles 20. In the embodiment illustrated in FIG. 13, no slats are provided. Protectors 19 are placed directly upon channeling baffles 20 which are generally triangular shaped, and a workpiece 40 is placed upon the horizontally arranged contact points that are formed by protectors 19 for supporting workpiece 40. Each channeling baffle 20 may be hollow.

Figure 14:
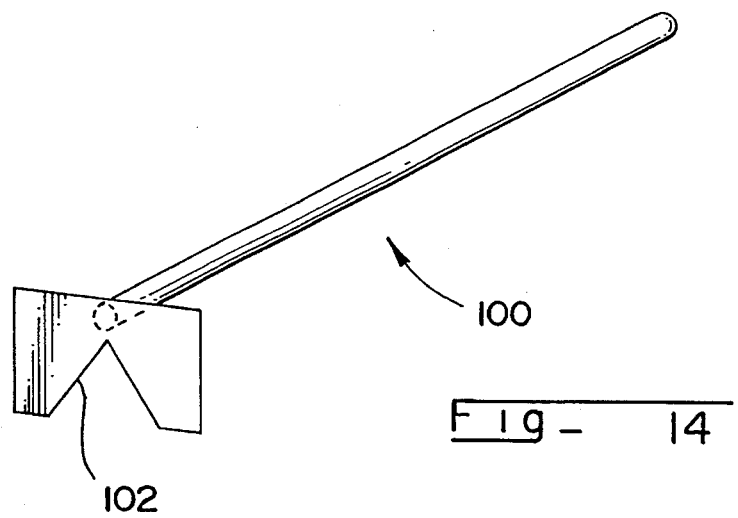
FIG. 14 is a hoe that may be provided in order to clean inverted V-shaped channeling baffles.

A significant problem associated with flame cutting tables is the removal and clean up of slag and other waste materials that are produced during the cutting process. In the water table illustrated in FIG. 1, a plurality of channeling baffles 20 are provided. During the cutting process, pieces of slag will be produced and will gather on top of channeling baffles 20. FIG. 14 illustrates a slag removal hoe 100 which may be utilized to remove slag from the substantially inverted V-shaped (or similar shaped) channeling baffles 20 by running the V-shaped cross-section portion 102 of hoe 100 along the upper surfaces of channeling baffles 20.

Figure 15:
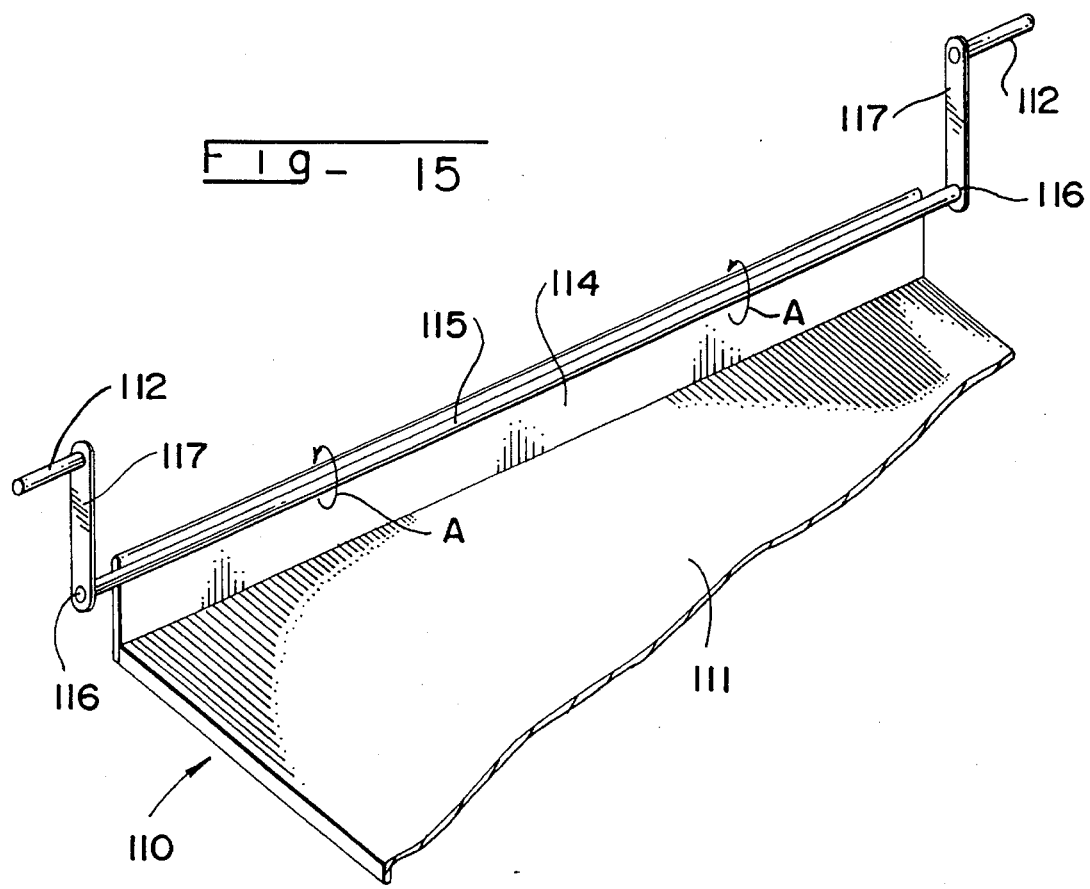
FIG. 15 is a cut-away perspective view of a tray that may be provided for collecting slag and other waste materials.
Figure 16:
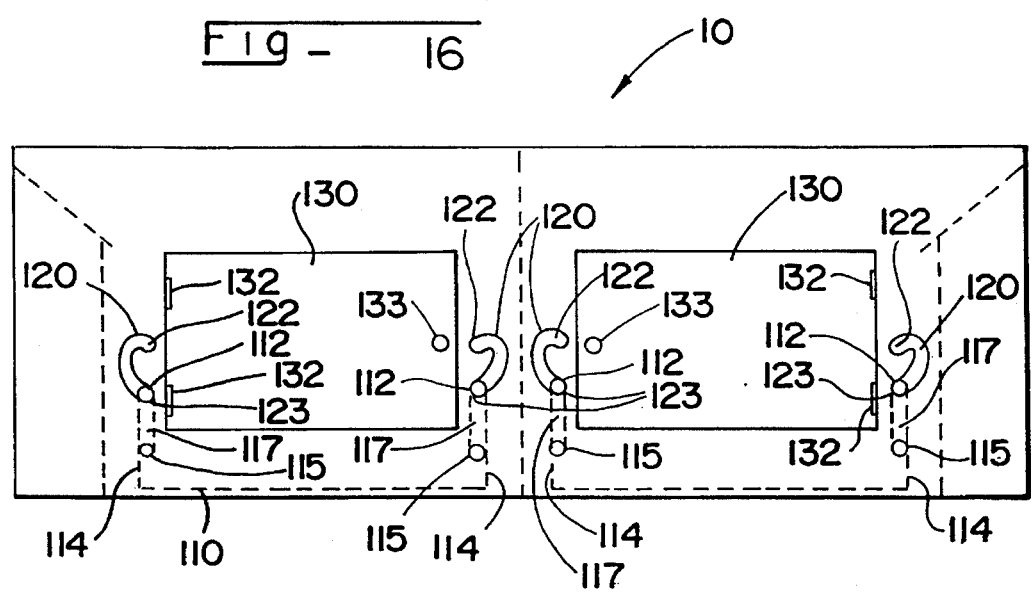
FIG. 16 is an end view of a flame cutting table, with doors that may be provided for facilitating the removal of slag and other waste materials collected by trays.

In order to collect slag and other waste materials that are produced during the cutting process, as shown in FIGS. 15 and 16, a slag collecting tray 110 may be provided at the bottom of the water table. FIGS. 15 and 16 illustrated a slag collecting tray 110 and the manner in which tray 110 may be utilized in a water table 10. FIG. 15 illustrates a cutaway view of an example slag collecting tray 110 that may be utilized in connection with a water table 10, e.g., in the manner illustrated in FIG. 16. Slag collecting tray 110 may be formed by a bent piece of sheet metal (or any suitable material that will not corrode under water), and preferably has a substantially flat and horizontal bottom plate 111, which serves to collect the slag and other waste materials that drop through the open top of the water table during the cutting process. Bottom plate 111 may be provided with a plurality of openings or drain holes (not shown) to further facilitate the drainage of water through the tray when the tray is lifted out of the water for removable of the slag and waste materials collected thereon. Said slag collecting tray 110 may further comprise vertical side members 114. An axle may be provided which extends along vertical side member 114, and which is securely but rotatably attached to vertical side member 114. The rotation of axle 115 may be in the direction of arrows A, and a mechanism may be utilized to secure axle 115 to vertical side member 114; such a mechanism is not explicitly illustrated in FIG. 15 in order to simplify the drawing. Each of handles 112 is connected to an end 116 of longitudinal axis 115 via a translating lever 117. Each handle 112 may be fixedly connected to a respective translating lever 117 in the manner shown, or may be rotatably connected thereto with the use of an appropriate rotating mechanism.

Referring to FIG. 16, a pair of handles 112 may be provided on each vertical side member of slag collecting tray 110, thus resulting in a set of four tray handles 112 for each slag collecting tray. The end of water table 110 may be provided with a pair of C-shaped slots 120, which each receive a tray handle 112. C-shaped slots 120 are provided to hold a slag collecting tray 110 in one of two positions: a first position in which the slag collecting tray is below a water level that is maintained in the bottom of water table 10, and a second position at which slag collecting tray 110 is above the maintained water level. In order to raise slag collecting tray 110 from the first position (i.e., the lower position), each handle 112 may be raised in an outward and upward direction, along the curve of C-shaped slot 120 and back in, until it reaches the upward resting position 122 of the C-shaped slot 120. In order to lower slag collecting tray 110 back to its lower position, each of tray handles 112 may then be slightly raised in an upward and outer direction and then lowered down along the curved surface of each C-shaped slot 120 back down to its lower resting position 123.

A door 130 may be provided for each chamber of water table 10, and thus for each slag collecting tray 110. Each door 130 may be connected to the wall of water table 10 via a plurality of hinges 132, and may be provided with a door knob 133 to facilitate the opening and closing of the door. In addition, a latch mechanism (not shown) may be provided for securely holding door 130 in a closed position. Each of doors 130 may be opened once each slag collecting tray 110 is raised into its second/raised position, and the slag and waste materials that have gathered at the bottom of the slag collecting tray 110 may be then removed through the opening created by opening the door. A more simplified slag collecting tray may be provided at the bottom of water table 10, and a crane or other mechanism may be utilized in order to remove the slag collecting tray in order to effect the removal of the slag and waste products that have gathered on the tray.

FIGS. 17A–17D illustrate various views of a channeling baffle 20 along with various mechanisms which facilitate the adjustment of the height of the channeling baffle. As shown in FIGS. 12B and 12C, adjusting the height of the channeling baffle results in changing the size of each restricted opening 42.

A mechanism may be provided for movably holding channeling baffle 20, so that it may be moved vertically but not laterally. For example, a plurality (e.g., two) of cylindrical guide members 158 may be fixed to each channeling baffle 20 as shown. Such cylindrical guide members 158 may be fixed to an underside of each side member of channeling baffle 20 so that they extend beyond the end 170 (see FIG. 17D) of channeling baffle 20, and may be received by the respective aligned vertical guide slots 160 which are formed in outer sidewall 17. Vertical guide slots 160 should be shaped and configured so that they provide a vertical guide for movement of each of cylindrical guide members 158, but at the same time maintain channeling member 20 in a set lateral position as shown in FIGS. 17A and 17C. A cap 164, shown in FIG. 17D, may be provided on the end of each of cylindrical guide members 158, to prevent cylindrical guide members 158 from being dislodged from their respective vertical guide slots 160.

A mechanism may be provided for holding channeling baffle 20 at a prescribed vertical adjustment position, and for changing/adjusting the vertical position of channeling baffle 20. For this purpose, a cam shaft 150 is shown which extends underneath and along the length of channeling baffle 20, as shown in FIG. 17B. Cam shaft 50 is shown to comprise a central shaft 152 and a plurality (e.g., three) of cams 154 distributed along cam shaft 152 and concentrically aligned with respect to cam shaft 152. A single cam 154 can be seen in each of FIGS. 17A and 17C. Each of cams 154 is in contact with a cam contact member 162 that is formed along a central underneath surface of channeling member 20 and which allows channeling baffle 20 to rest upon each of cams 154 in the manner illustrated in each of FIGS. 17A–17C. Cam contact member 162 may extend longitudinally from one end to another of channeling baffle 20, or a plurality of cam contact member sections may be provided which simply correspond in position to each of cams 154.

As each of cams 154 is rotated in a clockwise direction, a stop portion 166 of each cam 154 will come into contact with cam contact member 162. When stop portion 166 comes into contact with cam contact member 162, channeling baffle 20 has reached its highest vertical position. This position is illustrated in each of FIGS. 17A and 17C. As cams 154 are rotated in a counterclockwise direction, the vertical position of channeling baffle 20 will be lowered. When a lower stop portion 168 (see FIG. 17A) comes into contact with cam contact member 162, channeling baffle 20 will have reached its lowest vertical position.

Referring back to FIG. 17B, it is noted that cam shaft 150 may be supported at each end with an appropriate rotatable supporting member, and may be, e.g., rotatably fixed to each of side walls 17 (such a mechanism not being shown herein). A height adjustment lever 156 may be provided for rotating cams 154, and thus for adjusting the vertical position/height of channeling baffle 20. By rotating height adjustment lever 156 in the direction of arrow D as shown in FIG. 17C, channeling baffle 20 will be lowered. Each of cams 154 may be configured so that the height of channeling baffle 20 may be finely and gradually adjusted. A spring bias mechanism, or any other appropriate device or mechanism, may be provided to maintain channeling baffle 20 in firm contact with cams 154, and to keep the positions of cams 154 from changing unintentionally.

FIGS. 18A–18C illustrate, by way of example, several different manners in which the angle between two downwardly angled members 21 of a channeling baffle 20 may be adjusted. A manual and/or automated/motorized control mechanism 200 may be provided for controlling the adjustment of the angle between the downwardly angled members 21. Such an adjustment of the angle changes the sizes of the openings that are formed by channeling baffles 20.

Referring to FIG. 18A, a mechanism (not shown) may be provided for moving channeling baffle 20 by moving hinge 82. A motorized or otherwise mechanized member may be attached to channeling baffle 20 via hinge 82 and may be configured to move channeling baffle 20 vertically by moving hinge 82, as shown by the arrows in FIG. 18A. Each of downwardly angled members 21 may be slidably rested upon cylindrical rest members 202. Cylindrical rest members 202 may comprise cylindrical shafts that extend all the way along the length of channeling baffle 20, or may simply comprise pins that are connected to the walls which are at each end of channeling baffle 20 (e.g., outer wall 17 and central dividing wall 16). Accordingly, by raising channeling baffle 20 at hinge 82, the angle between downwardly angled members 21 will be decreased, and the openings will increase in size.

The manual and/or automated/motorized control mechanism 200 may also be provided to adjust the downwardly angled members in each of the embodiments shown in FIGS. 18B and 18C. Such a control mechanism may be configured to open or close the openings formed by channeling baffles 20 depending upon the type of material that is being cut, the thickness of the material, and the adjustment of the gas flow created by gas-driven cutting apparatus 22. For example, if a thicker or tougher workpiece is to be cut by gas-driven cutting apparatus 22, the flow of gases utilized by cutting apparatus may be increased. In this regard, an adjustment mechanism (not shown) may be provided for increasing the exhaust flow of ventilation and filtering system 29, while at the same time increasing the size of openings 42. Each of these adjustments would allow the table to accommodate the increased flow of gases and other contaminating matter into the upper open top of table 10.

Referring to FIG. 18B, as shown by the dotted arrow that extends from one of downwardly angled member 21 to another, a mechanism may be provided which directly adjusts the angle between downwardly angled members 21. The baffle shown in FIG. 18B may be completely closed, e.g., in order to allow slag and waste materials to drop into a grating or tray provided in the table.

In the alternative, as shown in FIG. 18C, a mechanism may be provided which directly adjusts the position of channeling baffle 20 by moving channeling baffle 20 up and down at hinge 82, as shown by the arrows in FIG. 18C. In order to direct the movement of downwardly angled members 21 as hinge 82 is being raised or lowered, a guide slot (in an inverted V-shape) 204 may be provided in the walls that are at each end of channeling baffle 20 (e.g., outer wall 17 and central dividing wall 16). Guide pins 206 may be coupled to downwardly angled members 21 at a lower terminating end thereof, and may be positioned so that they extend through the opening formed by guide slot 204. The inverted V-shaped guide slot 204 directs movement of pins 206 so that when hinge 82 is moved in a vertical direction, the angle between downwardly angled members 21 is either increased or decreased.

As shown in FIG. 19, ventilation and filtering system 29 may be built into stationary water table 10. A filter 300 having an input opening 302 may be provided at each side of water table 10. Filter 300 may then be directly connected to a fan/motor module 304, which has an exhaust duct 306 which is routed outside of water table 10. A slanted roof member (not shown) may be provided which covers ventilation and filtering system 29 so that any slag and other materials that are formed during the cutting process do not gather on top of the modules which form the ventilation or filtering system 29. Table 10 may be configured to accept modular filter units, including filters 300 and fan/motor modules 304, in order to allow easy removal, repair, and/or replacement of the modular filter units. This would allow modification of water table 10 in the event that a higher capacity ventilation system is needed to create the needed negative pressure in negative pressure chamber 50. The channeling baffles described herein (e.g., in FIG. 3) may be formed with angle iron or separate bars that are placed at 45° with respect to each other. Such channeling baffles can be configured to cover about 75% of the open surface that originally existed between each of slats 18, thus cutting dramatically down the amount of the exhaust air flow (CFM) that would be required to maintain a necessary amount of negative pressure within negative pressure chamber 50.

A mechanism may be provided for adjusting the outward air flow created by the ventilation and filtering system 29 for various sections of water table 10. Water table 10 may be sectioned off, and thus may have several chambers therein with a specific fan unit provided for each separate chamber. Depending upon the demands of each chamber, and whether cutting is being performed above each chamber, the fan units may be selectively switched ON or OFF and/or the outward air flow created by each fan may be adjusted.

While the invention has been described with reference to preferred embodiments, it is understood that the words which have been used herein are words of description, rather than words of limitation. Changes may be made, within the purview of the appended claims, without departing from the scope and spirit of the invention in its aspects. Although the invention has been described herein in reference to particular means, materials, and embodiments, it is understood that the invention is not to be limited to the particulars disclosed herein, and that the invention extends to all equivalent structures, methods, and uses, such as are within the scope of the appended claims.

What is claimed:

1. A table for use with a gas-driven cutting apparatus, said table supporting a workpiece in a manner suitable for cutting of the workpiece by said gas-driven cutting apparatus which forces hot gases in a downward direction into said table in order to cut the workpiece, said table comprising:

an open table top having a plurality of openings for receiving the forced hot gases and a plurality of distributed horizontally arranged contact points for supporting the workpiece, said openings being distributed across said open table top;

a stationary negative pressure chamber, situated below said table top and coupled to each of said openings; and said table further comprising a plurality of horizontally extending members having longitudinal axes extending across said open table top, said horizontally extending members forming downwardly angled upper surfaces that partially close off each of said openings, said downwardly angled upper surfaces each having a lower terminating end that forms a restricted opening in direct contact with the inside of said negative pressure chamber.

2. The table according to claim 1, wherein said negative pressure chamber comprises at least one sealed lower portion for containing a non-flammable liquid underneath each of said openings.

3. The table according to claim 1, further comprising said gas-driven cutting apparatus, comprising at least one of an oxyfuel cutting apparatus and a plasma-arc cutting apparatus.

4. The table according to claim 1, further comprising a ventilation and filtering system comprising at least one duct, at least one fan, and at least one filter, said at least one duct having an air input terminating within said negative pressure chamber and forming an air passage that extends from said negative pressure chamber to said fan and said filter.

5. The table according to claim 4, wherein said fan and said filter are each mounted externally to said table.

6. The table according to claim 4, wherein said fan and said filter are each integrally mounted within said table.

7. The table according to claim 1, wherein said table comprises a plurality of vertically arranged slats having longitudinal axes extending across said open table top, said slats being distributed along said table top and forming in part said openings in said open table top.

8. The table according to claim 7, said table further comprising a plurality of horizontally extending members placed between pairs of said slats, said horizontally extending members together forming downwardly angled upper surfaces that partially close off each of said openings, said downwardly angled upper surfaces each having a lower terminating end that forms a restricted opening in direct contact with the inside of said negative pressure chamber.

9. The table according to claim 8, wherein said horizontally extending members comprise a cross-sectional shape substantially in the form of an inverted V.

10. The table according to claim 9, further comprising adjustment means for adjusting the size of said opening.

11. The table according to claim 10, wherein each of said horizontally extending members comprises two side members and a hinge connecting said side members to each other, and wherein said adjusting means comprises means for changing the angle of said downwardly angled upper surfaces by moving said two side members in relation to each other.

12. The table according to claim 10, wherein said adjusting means comprises means for adjusting the height of said horizontally extending members in relation to a bottom of said slats.

13. The table according to claim 9, wherein each of said horizontally extending members has a fixed cross-sectional shape and is mounted within said open table top between a pair of slats at a fixed height in relation to a bottom of said pair of slats.

14. The table according to claim 10, wherein each of said horizontally extending members comprises a slot for removably holding one of said slats.

15. The table according to claim 1, wherein said negative pressure chamber comprises a sealed lower portion for containing a non-flammable liquid underneath each of said openings, and means for maintaining said non-flammable liquid to be within a desired range of liquid levels.

16. The table according to claim 15, wherein said table further comprises a tray and means for positioning said tray to be at one of two positions, including a first position below said desired range of liquid levels and a second position above said desired range of liquid levels.

17. The table according to claim 1, further comprising means for adjusting a slope of said downwardly angled upper surfaces.

18. The table according to claim 17, wherein said means for adjusting a slope comprises means for adjusting a size of said restricted opening in direct contact with the inside of said negative pressure chamber.

19. The table according to claim 18, wherein said horizontally extending members comprise at least two side members and a hinge connecting said side members to each other, and wherein said means for adjusting comprises means for changing an angle between said downwardly angled upper surfaces by moving said at least two side members in relation to each other.

20. The table according to claim 1, wherein adjacent pairs of said downwardly angled upper surfaces form an angle of approximately 45 degrees.

* * * * *